United States Patent [19]

Yamada

[11] Patent Number: 5,798,738

[45] Date of Patent: Aug. 25, 1998

[54] PRINTING MANAGER SYSTEM FOR A COPIER IN A NETWORK

[75] Inventor: Daisuke Yamada, Kawaguchi, Japan

[73] Assignee: Ricoh Company, Ltd., Tokyo, Japan

[21] Appl. No.: 622,247

[22] Filed: Mar. 25, 1996

[30] Foreign Application Priority Data

Mar. 25, 1995 [JP] Japan ................................. 7-091748

[51] Int. Cl.$^6$ ........................... G09G 5/00; G03G 15/00
[52] U.S. Cl. ...................................................... 345/2; 399/8
[58] Field of Search .................................. 345/1, 2, 146, 345/150, 153, 329, 961; 707/527; 399/8, 81; 358/531, 537

[56] References Cited

U.S. PATENT DOCUMENTS

| | | | |
|---|---|---|---|
| 5,084,875 | 1/1992 | Weinberger et al. | 399/8 |
| 5,214,772 | 5/1993 | Weinberger et al. | 399/8 |
| 5,603,060 | 2/1997 | Weinberger et al. | 399/8 |

*Primary Examiner*—Jeffery Brier
*Attorney, Agent, or Firm*—Oblon, Spivak, McClelland, Maier & Neustadt, P.C.

[57] ABSTRACT

A print manager system for a copying machine in a network which includes at least one copier machine, at least one terminal, and an object request broker. The copier machine has a CPU for controlling the copier, a memory for storing control programs and a copier machine's appearance data, and a communication device for transferring the appearance data. The appearance data may include a picture of the appearance of the copier, a picture of an operation panel of the copier, and specifications or status information of each device of the copier. The terminal is connected to the copier machine, and has a display device for displaying the data from the copier machine, a pointing device for pointing to a part of the displayed images of the display device, and a communication device for transferring coordinate numerical data of the part of the displayed images pointed to by the pointing device to the copier machine. The object request broker is connected to the copier machine and the terminal, and has a CPU controlling the object request broker, a memory storing control programs for controlling the object broker, and a service controller for controlling an interface between the copier machine and the terminal for selecting a best available copier machine for the terminal.

16 Claims, 22 Drawing Sheets

| VP | | PN |
|---|---|---|
| ID | TYPE | POSITION |
| COOR(x,y) | | (x,y) |
| VP | | PN |
| ID | TYPE | POSITION |
| COOR(x,y) | | (x,y) |
| X SIZE | | Y SIZE |
| APPEARANCE DATA | | |
| VP | | PN |
| ID | TYPE | POSITION |
| COOR(x,y) | | (x,y) |
| VP | | PN |
| ID | TYPE | POSITION |
| COOR(x,y) | | (x,y) |
| X SIZE | | Y SIZE |
| APPEARANCE DATA | | |

*FIG. 7*

| DATA LENGTH | |
|---|---|
| ID TYPE POSITION | |
| COM | PARA |
| COM | PARA |
| VP | PN |
| ID TYPE POSITION | |
| COM | PARA |
| COM | PARA |

*FIG. 8*

| NUMBERS OF DEVICE |
|---|
| ID TYPE POSITION |
| ID TYPE POSITION |
| ID TYPE POSITION |

*FIG. 9*

PRINTING MANAGER SYSTEM FOR A COPIER IN A NETWORK

BACKGROUND OF THE INVENTION

1. Field of the Invention

This invention relates to a print manager system for copying machines with improved communicative functions, and more particularly, to remote controlling such copying machines.

2. Discussion of the Background

A network system which contains a number of workstations or personal computers and a number of digital multi-function copying machines which typically combine a copier function, a facsimile function, a printer function, and a scanner function, is known in the art.

An user uses the copying machines connected to the network to print out documents which the user produced at their local workstations or personal computers. When the user wants to print out the documents, he/she walks down to the copying machine and has to change it's mode on an operation panel of the machine to a "REMOTE MODE" from a "STAND-ALONE MODE". Because the multi-function copying machine does not have only the printer function, but also the other functions as explained above, it is necessary to change the mode at first. And then the user sets up or programs some sorts of conditions of the machine. For example, the user has to check what paper size trays are included in the machine, how many papers there are left in the trays, what is a status of a sorting device, and so on. Then he/she has to select the best available tray that he/she wants, and the user also has to check whether or not the machine is under operation. And then the user comes back to his workstation and transfers his/her data for the documents to be printed out. After the documents have been printed out, the user walks down to the copier machine again to pick up the documents and to change the mode back to the original mode. It takes much time for the users to perform these operations, especially if the networks cover a wide area so that each workstation is located at a distance from the copier machine.

Additionally, an operating way and procedure of the copier on the "STAND-ALONE MODE" is quite-different from those on the "REMOTE MODE", so that the users have to know each of the operations. And if there are different kinds of workstations or personal computers, and each workstation has a unique operating way to operate the copier, the users also have to know all these unique operating ways and procedures.

SUMMARY OF THE INVENTION

Accordingly, one object of this invention is to provide a novel print manager system which overcomes the drawbacks in the background devices.

It is a further object of the present invention to provide a novel print manager system for copying machines capable of remote programming the copier machines from a workstation.

It is an another object of the present invention to provide a novel print manager system for copying machines capable of remote programming the copier machines from a workstation without requiring any special hardware and any special software.

It is still another object of the present invention to provide a novel print manager system for copying machines capable of remote programming the copier machines from any type of workstation without requiring any special hardware and any special software.

In order to achieve the above objects, briefly, the present invention is a novel print manager system for a copying machine in a network which includes at least one copier machine, at least one terminal, and an object request broker. In particular, the copier machine has a CPU for controlling the copier, a memory for storing control programs and a copier machine's appearance data, and a communication device for transferring data. The appearance data includes a picture of the appearance of the copier, a picture of an operation panel of the copier, and specifications or status information of each device of the copier. The terminal is connected to the copier machine, and has a display device for displaying the data from the copier machine, a pointing device for pointing to a part of displayed images of the display device, and a communication device for transferring a coordinate numerical data of the part of the displayed images pointed out by the pointing device to the copier machine. And the object request broker is connected to the copier machine and the terminal, and has a CPU controlling the entire of the object request broker, a memory for storing control programs for controlling the object broker, and a service controller for controlling the interface between the copier machine and the terminal for selecting a best available copier machine for the terminal.

BRIEF DESCRIPTION OF THE DRAWINGS

The above and other objects, features and advantages of the present invention will become more apparent from the following detailed description when taken with the accompanying drawings in which:

FIG. 7 shows a data structure of an appearance information data written in a raster data format;

FIG. 8 shows a data structure of appearance information data written in a graphics command format;

FIG. 9 shows a data structure of appearance information data written in a logical device information format;

DESCRIPTION OF THE PREFERRED EMBODIMENTS

A description will now be given of an embodiment of a print manager system according to the present invention.

Figure 1:
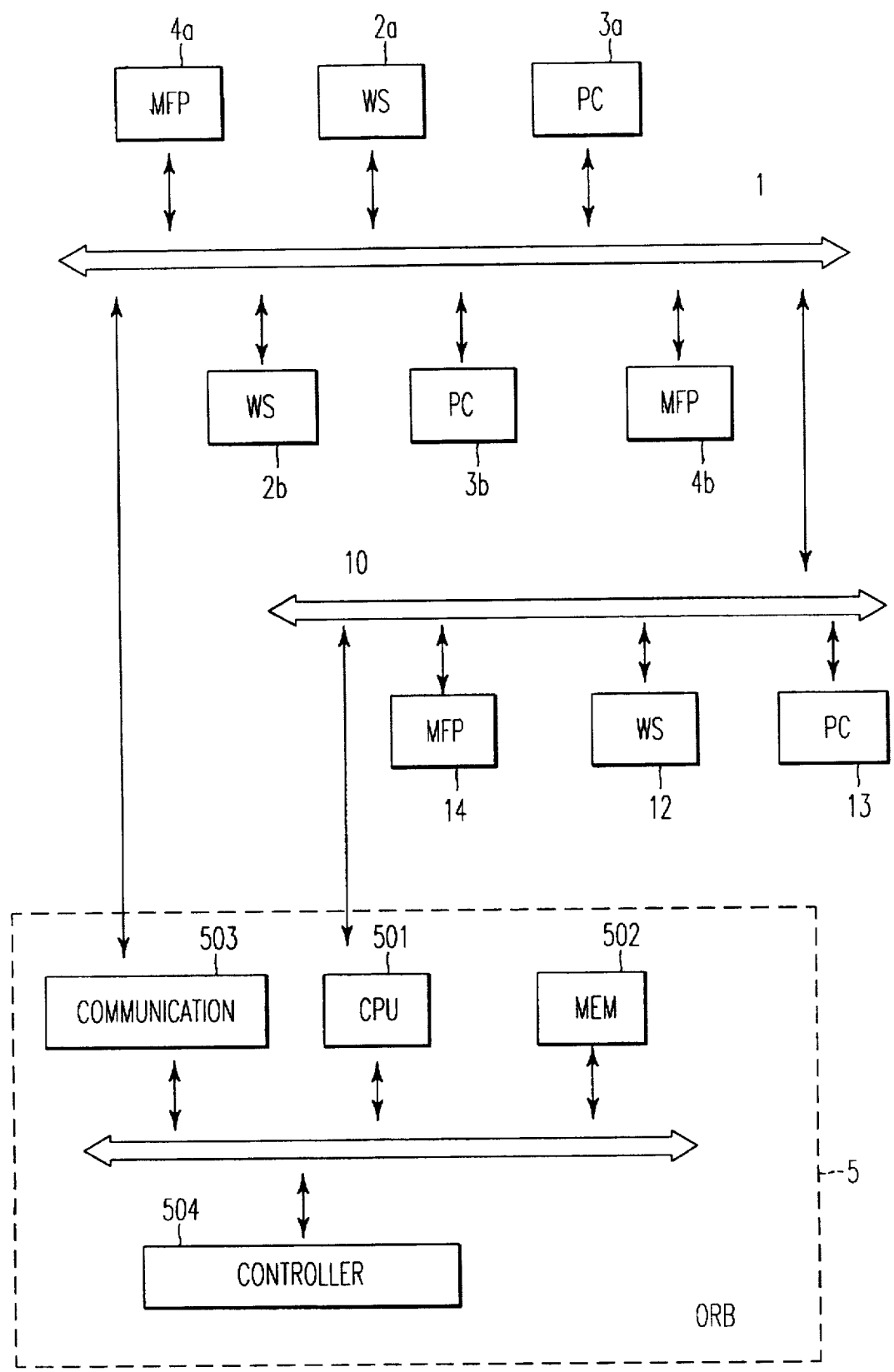
FIG. 1 is a schematic block diagram of a network system of the present invention.

FIG. 1 is an illustration showing a system structure of an embodiment of a print manager system according to the present invention. In this system, there are two network systems 1 and 10 and they are connected to each other. The first network system 1 contains a number of workstations 2a and 2b (hereinafter referred to as simply "workstation 2"), a number of personal computers 3a and 3b (hereinafter referred to as simply "personal computer 3"), and a number of digital multi-function copiers 4a and 4b (hereinafter referred to as simply "copier 4"). The workstations 2 and the personal computers 3 are referred to as terminals or clients in the network environment. The multi-function copiers 4 are referred to as servers in the network environment. And the second network system 10 also contains a workstation 12, a personal computer 13, and a digital multi-function copier 14. Both of the two network systems 1, 10 are connected to an object request broker (ORB) 5.

Briefly, the object request broker 5 controls the workstations, the personal computers, and the copiers which are connected to the network systems. The object request broker 5 includes a CPU 501, a memory 502, a communication controller 503, and a service controller 504. The CPU 501 controls the entire system of the broker 5. Many kinds of programs and data for controlling the broker 5 are installed in the memory 502. The service controller 504 controls an interface between the terminals and the copiers. When the service controller 504 receives a request from a terminal, the controller 503 inquires with each copier whether or not the request can be implemented by each copier. And after receiving answers from each copier to the inquiry, the controller 503 selects the best available copier to be connected to the terminal. Details as to the performance of the broker 5 will be explained later.

Figure 2A:
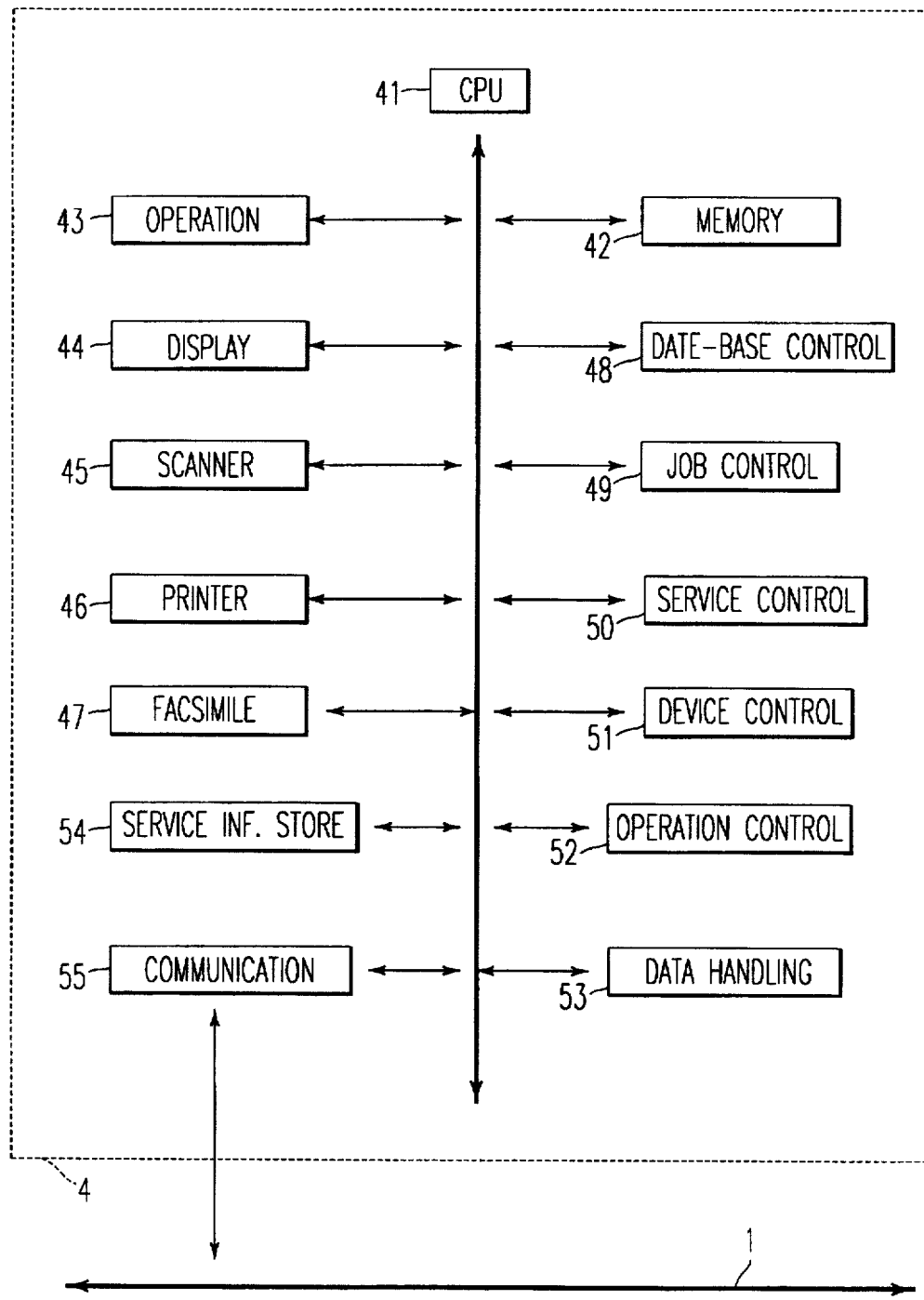
FIG. 2a is a schematic block diagram of a multi-function copier of the present invention.

Each multi-function copier 4 typically combines a copier function, a facsimile function, a printer function, and a scanner function, or some of these functions. As shown in FIG. 2a, the multi-function copier 4 includes a CPU 41, a memory 42, an operation device 43, a display device 44, a scanner device 45, a printer device 46, a facsimile device 47, a data-base controller 48, a job controller 49, a service controller 50, a device controller 51, an operation controller 52, a data handling device 53, a service information storing device 54, and a communication controller 55.

The CPU 41 controls the entire of the multi-function copier machine 4. The memory 42 stores control programs and data for many kinds of implementations by the copier. The data-base controller 48 controls some types of data, such as font data, form data, scanned image data, data from a facsimile device, and data of an operation. The controller 48 also accesses and stores the data. When a job requested by a user of a terminal includes a plurality of implementations of services, the job controller 49 controls the implementations one by one. The service controller 50 conducts controls, implementations, reports for completion, and status controls for a copy service, a facsimile service, a printer service, a scanner service, and so on. The device controller 51 conducts controls, accesses, and status controls to use the above mentioned devices of the copier. The data handling device 53 stores data from the terminals. The service information storing device 54 stores information data of the copier as to an appearance information data of the copier and operation panel, and specifications of each device of the copier, and so on. The operation controller 52 stores input information data from the operation device 43 and outputs the data and the data from the data handling device 53 to the display device 44.

Figure 3:
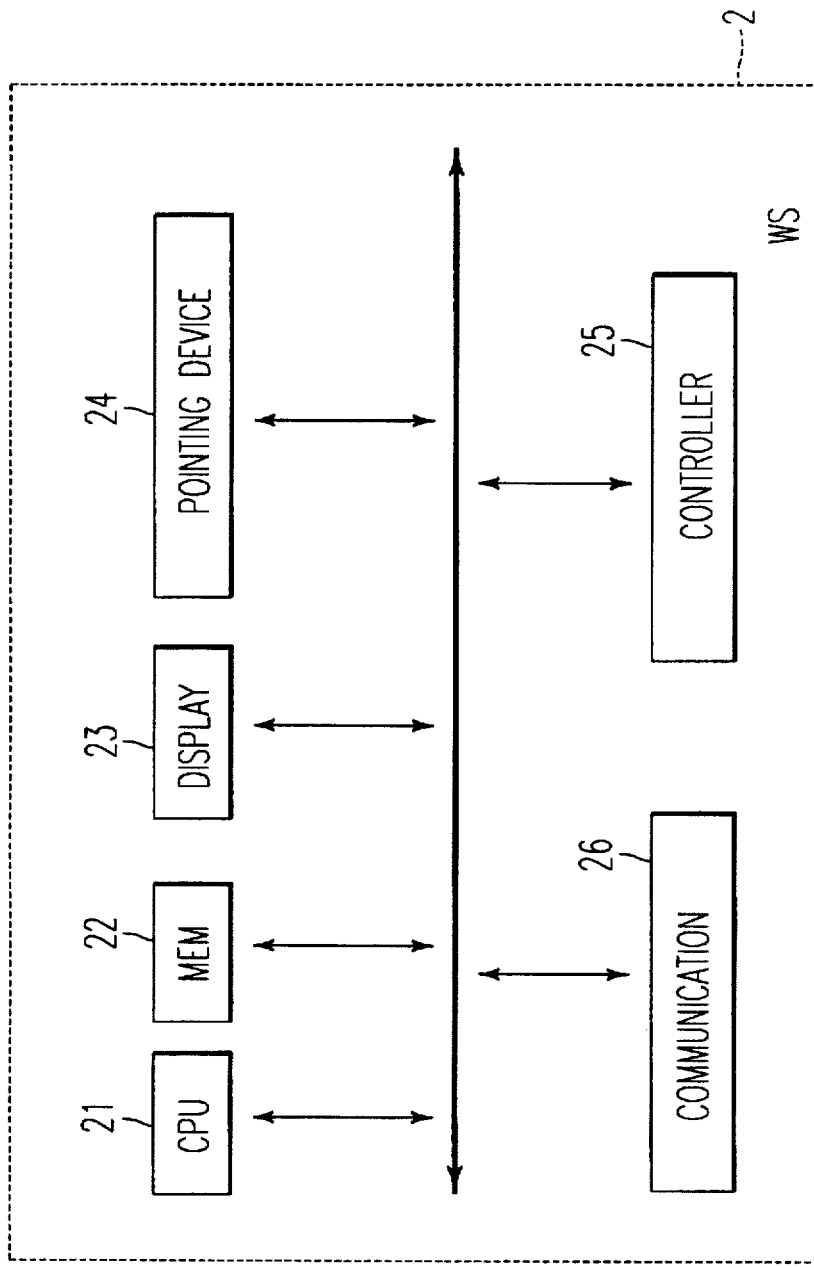
FIG. 3 is a schematic block diagram of a workstation of the present invention.

As shown in FIG. 3, the workstation terminal 2 includes a CPU 21 which controls the whole device, a memory 22 which stores control programs and data for some types of implementations, an operating display device 23, such as a CRT or an LCD for displaying messages to the user, a pointing device 24 such as a mouse, a display controller 25 which controls the operating display apparatus 23, and a communicating device 26. Each terminal, which may be referred to as a client, is operated by the user using the information processing system. As stated before, each terminal is provided with a display apparatus 23 for interfacing between the user and the system. Generally, the display apparatus 23 has a sophisticated user interface so that the user can input instructions for various functions incorporated in the system by a simple inputting operation.

Figure 2B:
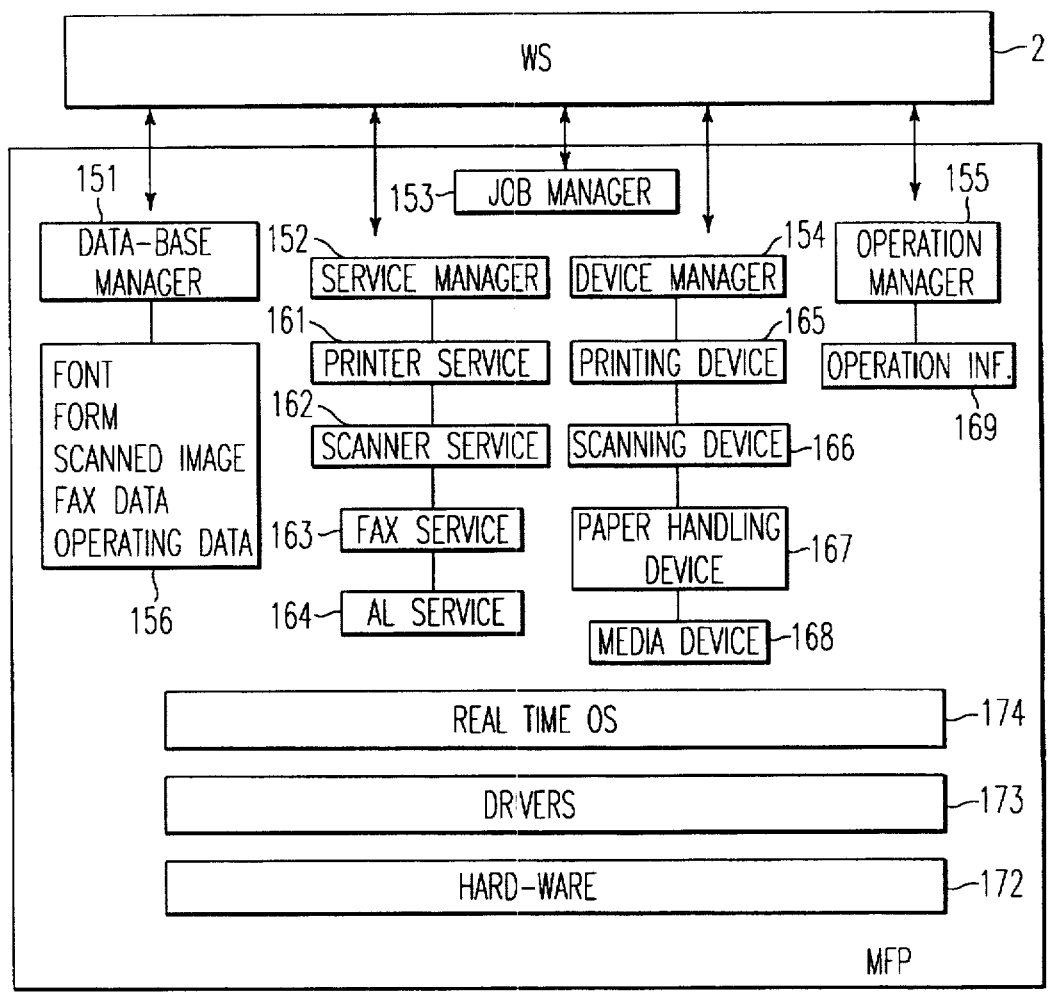
FIG. 2b is a structure of software in the multi-function copier.

FIG. 2b shows a structure of software in the copier machine 4. There are five controlling programs or managing programs 151, 152, 153, 154 and 155 which control the copier. A data-base manager 151 controls and accesses many kinds of data-bases 156, such as a font data-base, a form data-base, a scanned image data-base, and so on. A service manager 152 controls some kinds of service programs, such as a printer service program 161, a scanner service program 162, a fax service program 163, and an AI service program 164. A device manager 154 controls some kinds of devices, such as a printing device 165, a scanning device 166, a paper handling device 167, and a media device (e.g., a FD and a MD) 168.

Further, operation manager 155 controls some kinds of operating information 169. And the above manager programs are controlled by a real time OS (operating system) program 174. The copier machine also has some kinds of hardware 172, such as the printing device, the scanning, device, and the paper handling device, and the media device, and the devices are driven by some drivers 173.

The above operation information 169 includes displaying information, such as bit-map information and coordinate information, on a display. The information 169 also includes operating control flow information, such as operation panel information, key operation information and so on, which is used to determine what is an operating sequence from an operating panel.

On the other hand, the computer 3 can access each manager 151 to 155, so that it obtains some kinds of information, orders to conduct performance, obtains present status of the copier, and obtains complete reports.

There may be three types of a print manager system as to the network to which clients and servers are connected. The first type is a network which includes one client and one server connected to each other. The second type is a network which includes multi-clients and one server connected to each other. The third type is a network which includes multi-clients and multi-servers connected to each other. The second and third ones will be explained in detail hereinafter.

Figure 4A:
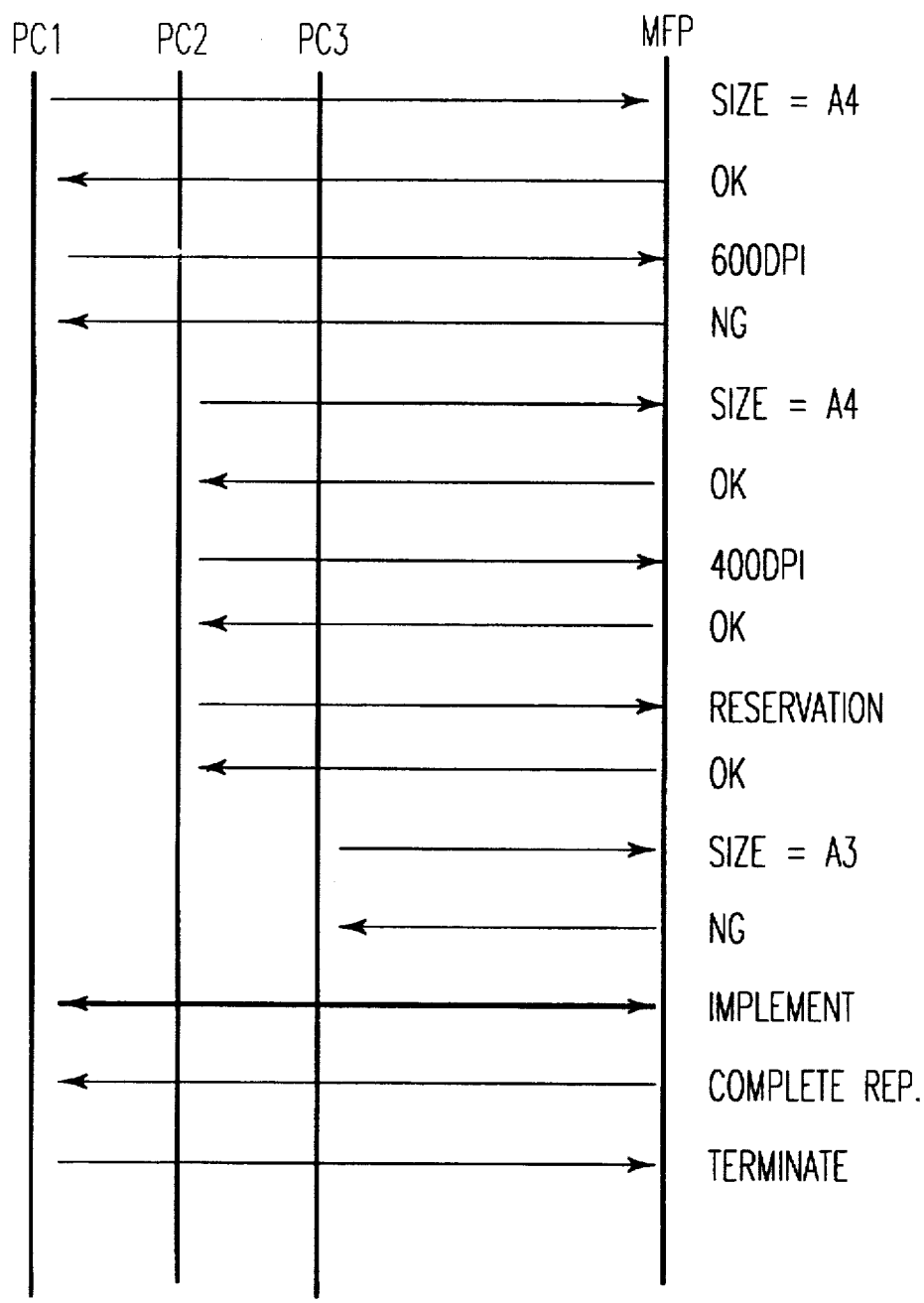
FIG. 4a is a communication sequence or a protocol between three workstations and a multi-function copier according to an embodiment of the present invention.

FIG. 4a shows a communication sequence between three clients PC1, PC2, PC3 and a server MFP to find whether or not the server has capabilities to be satisfied with a given request from the clients. The server MFP has it's own capabilities, for example, "print paper size" and "optical resolution" which have been registered. In this embodiment, the registered specification for this server MFP are "print paper size=A4,B5,A5,A6,B6,A7" and "optical resolution= 400 dpi".

In the above situation, the client PC1 requests "A4 and 600 dpi", the client PC2 requests "A4 and 400 dpi" and the client PC3 requests "A3 and 600 dpi". At first, a request "print paper size=A4" is transferred from the client PC1 to the server MFP, and then the server MFP returns it's answer "OK" to the client PC1. But for the request "optical resolution=600 dpi", the server MFP returns it's answer "NG" (no good) since the server only has an optical resolution of 400 dpi. On the other hand, as to the client PC2, the server MFP returns it's answer "OK" for both requests, so that the client PC2 transfers a reservation request to use the server. If the server MFP admits the reservation, it transfers the answer "OK" and the client PC2 is connected to the sever to use the server's service (on-line condition). As to the client PC3, the server MFP returns it's answer "NG".

Then printing data is transferred from the client PC2 to the server MFP, and the data is printed out in the server MFP. After the implementation of the printing in the server MFP, the server MFP transfers the completion report to the client PC2 and the client PC2 terminates the connection between the server MFP and the client PC2. The above mentioned implementation of the printing will be explained in detail later.

Figure 4B:
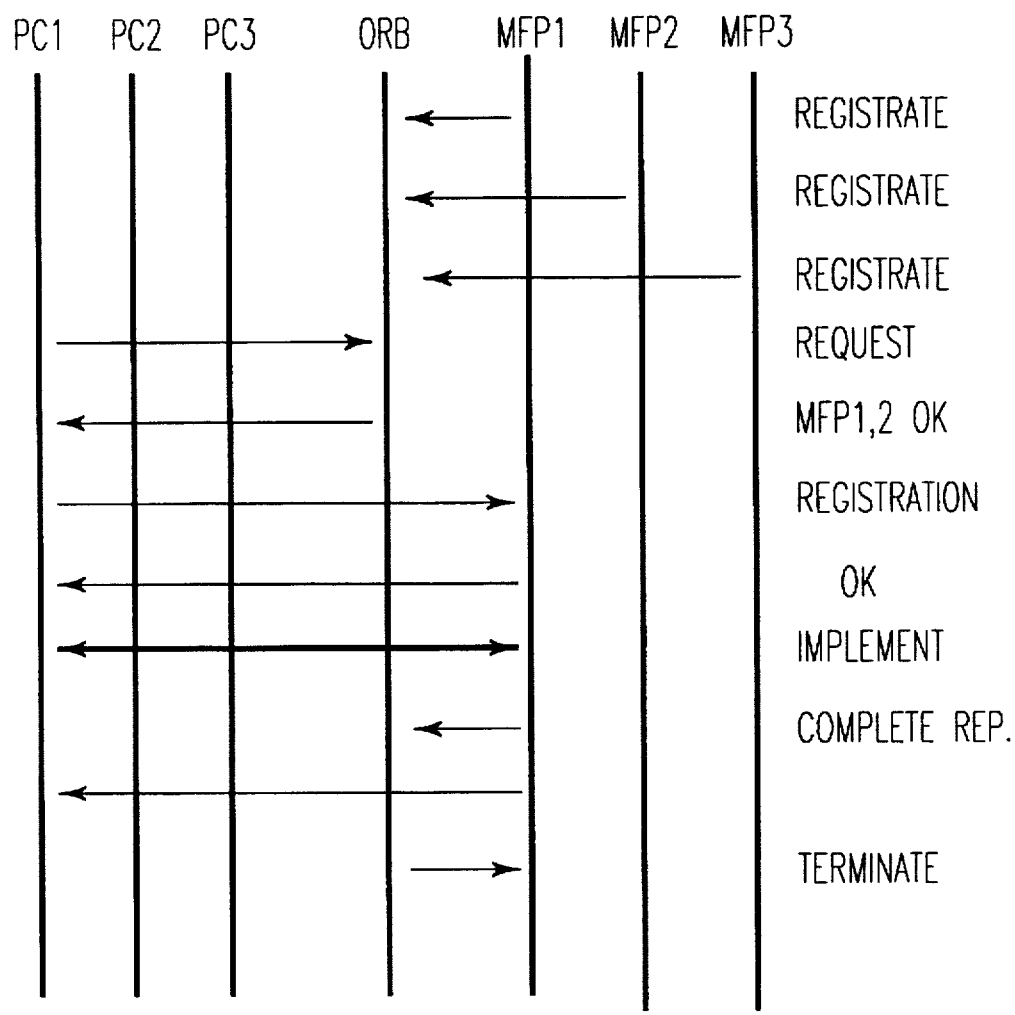
FIG. 4b is a communication sequence or a protocol between three workstations, three multi-function copiers, and an object request broker according to an embodiment of the present invention.

FIG. 4b shows a communication sequence among three clients PC1, PC2, PC3, three servers MFP1, MFP2, MFP2, and an object request broker ORB to find the best available server to be satisfied with a given request from one of the clients. The servers each have their own capabilities, for example "print paper size" and "optical resolution", which have been registered in the object request broker ORB. In this embodiment, the registered specifications for the first server MFP1 are "print paper size=A3,A4,B5,A5,A6,B6, A7" and "optical resolution=400 dpi", the registered specifications for the second server MFP2 are "print paper size=A3,A4,B5,A5,A6,B6,A7" and "optical resolution=600 dpi".

In the above situation, the client PC1 requests "A3 and 400 dpi", and then the broker answers to the client PC1 "the servers MFP1 and MFP2 are available to satisfy your request". And then the client PC1 selects the server MFP1, because the server MFP1 is located nearer to the client PC1. The client PC1 transfers a reservation request to use the server MFP1. If the server MFP1 admits the reservation, it transfers the answer "OK" and the client PC1 is connected to the sever MFP1 to use the server's service (on-line condition).

Then printing data is transferred from the client PC1 to the server MFP1, and the data is printed out in the server MFP1. After the implementation of the printing in the server MFP1, the server MFP1 transfers the completion report to the client PC1 and terminates the connection between the server MFP1 and the client PC1. The above mentioned implementation of the printing will be explained in detail later.

Figure 5A:
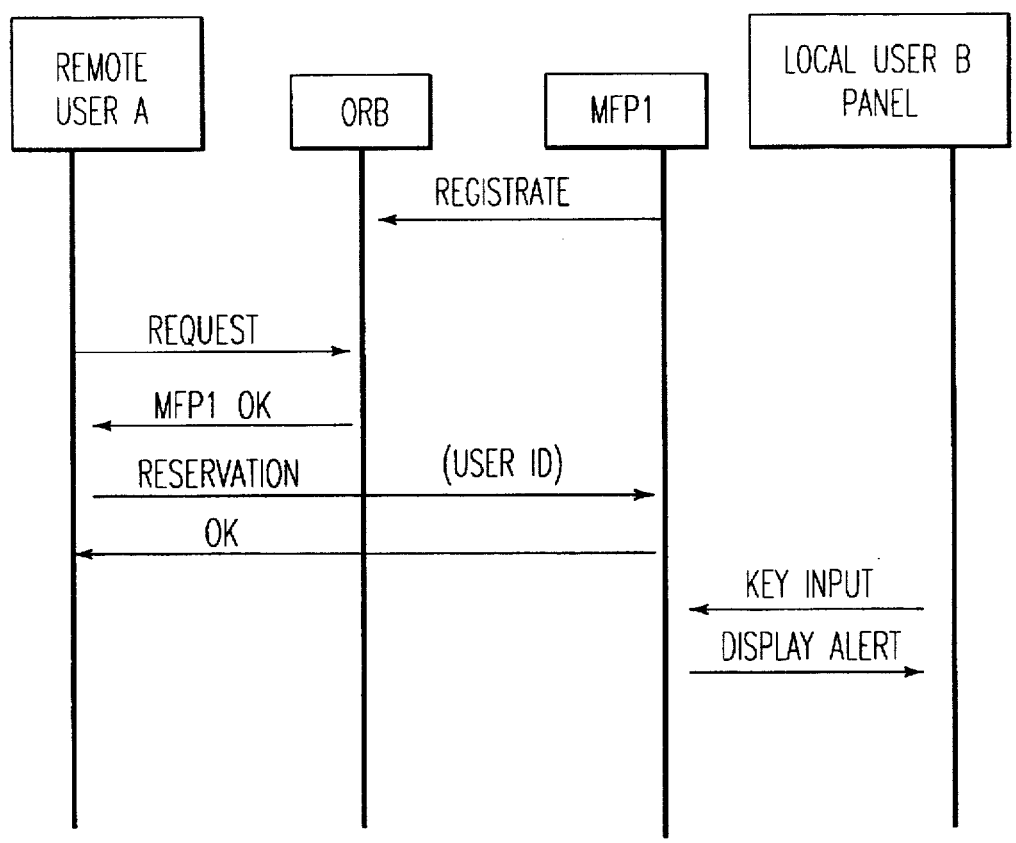
FIG. 5a shows a communication sequence among a remote user with a workstation, a server, a local user at an operation panel of the server, and an object request broker.
Figure 5B:
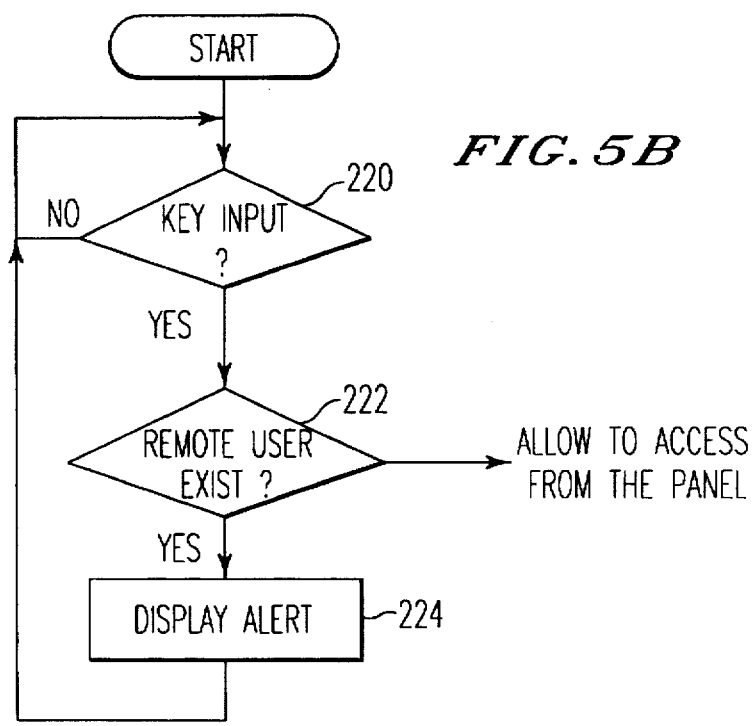
FIG. 5b shows a flowchart for controlling a server from the operation panel.

FIG. 5a shows a communication sequence among a remote user A, e.g. a workstation PC, a server MFP1, a local user B at an operation panel of the server, and an object request broker ORB. As explained before, the server MFP1 has it's own capabilities, for example, "print paper size" and "optical resolution", which have been registered in the object request broker ORB. The remote user A requests capabilities, such as "A4 and 600 dpi", and then the broker ORB answers to the client PC1 "the servers MFP1 is available to satisfy your request". The user A transfers a reservation request and an user identification number (ID) to use the server MFP1. If the server MFP1 admits the reservation, it transfers the answer "OK" and the remote user A is connected to the sever MFP1 to use the server's service (on-line condition). Under this situation, assume user B comes to the copier (MFP1) to use the machine to make copies, and then operates the operation panel to touch the keys to input, see step 220 of FIG. 5b. But the server (MFP1) rejects the access from the local user B because it has been already connected to the user A, see step 222 and sends information to display an alert on the operation panel, see step 224. If the user identification has not been set, NO in step 222, the local user B can use the server (MFP1). The identification may be a user's code number, a department code, or a log-in code for the network system. FIG. 5b thus shows a flowchart for controlling the sever (MFP) from the operation panel.

It is also possible to display the user's information instead of the alert on the operation panel. The user's identification number is memorized with some supplementary items, such as the user's name, department and post, telephone number, and so on. The supplementary items can also be displayed on the operation panel.

Figure 5C:
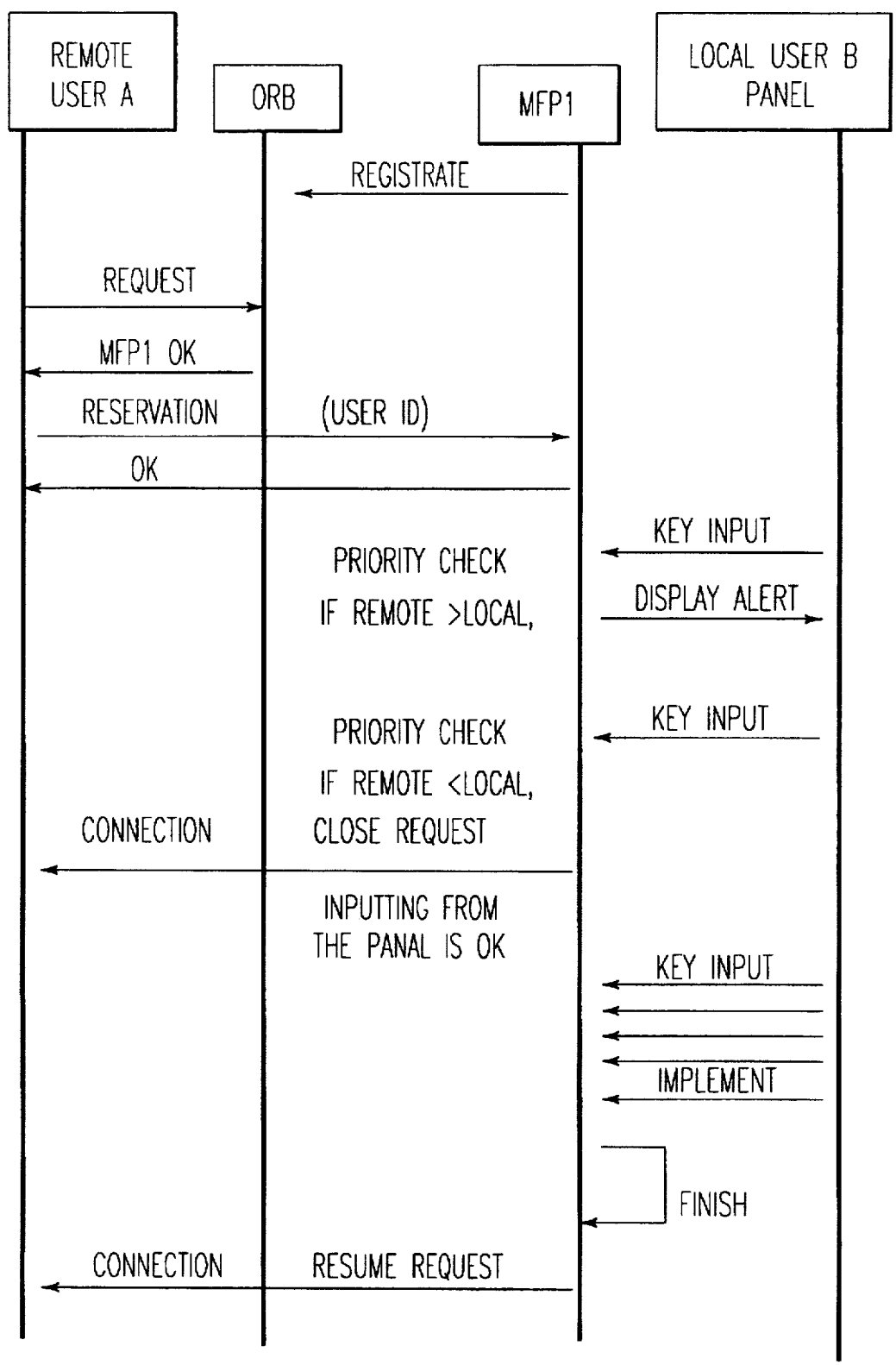
FIG. 5c shows a communication sequence among a remote user with a workstation, a server, a local user at an operation panel of the server, and an object request broker.

FIG. 5c also shows a communication sequence among a remote user A, e.g. a workstation PC, a server MFP1, a local user B at an operation panel of the server, and an object request broker ORB. As explained before, the server MFP1 has it's own capabilities, for example, "print paper size" and "optical resolution", which have been registered in the object request broker ORB. The remote user A requests capabilities, such as "A4 and 600 dpi", and then the broker ORB answers the best available server to the client PC1, for example, "the servers MFP1 is available to satisfy your request". The user A transfers a reservation request and a user identification number (ID) to use the server MFP1. If the server MFP1 admits the reservation, it transfers the answer "OK" and the client PC1 is connected to the sever MFP1 to use the server's service (on-line condition). Under this situation, assume a user B comes to the copier (MFP1) to use the machine to make copies, and then operates the operation panel to touch the keys to input. Each user has a user identification number, which additionally may have a priority ranking with the above mentioned supplementary items. If the remote user's A priority is higher than the local user's B priority, the server (MFP1) rejects the access from the local user B and sends information to display an alert on the operation panel. If the remote user's A priority is lower than the local user's B priority, the server (MFP1) accepts the access from the local user B and sends information to the remote user A for a connection closing request. After implementation of the server (MFP1), the server sends information to the remote user A for a connection resuming request.

It is also possible to determine the priority between the remote user A and the local user B by an interactive communication between the users. For example, when the local user B accesses to the sever MFP1, the sever MFP1 asks the remoter user A a request as to whether it is possible for the user to have a tentative disconnection between the remote user A and the server MFP1. If the remoter user A answers that it is OK, the local user B can use the server MFP1. But if the remote user A answers that it is not OK, the local user B can not use the server MFP1.

After the client or terminal is connected to the best available server or copier to satisfy the given request, it starts to implement the printing service between the client and the server.

Figure 6:
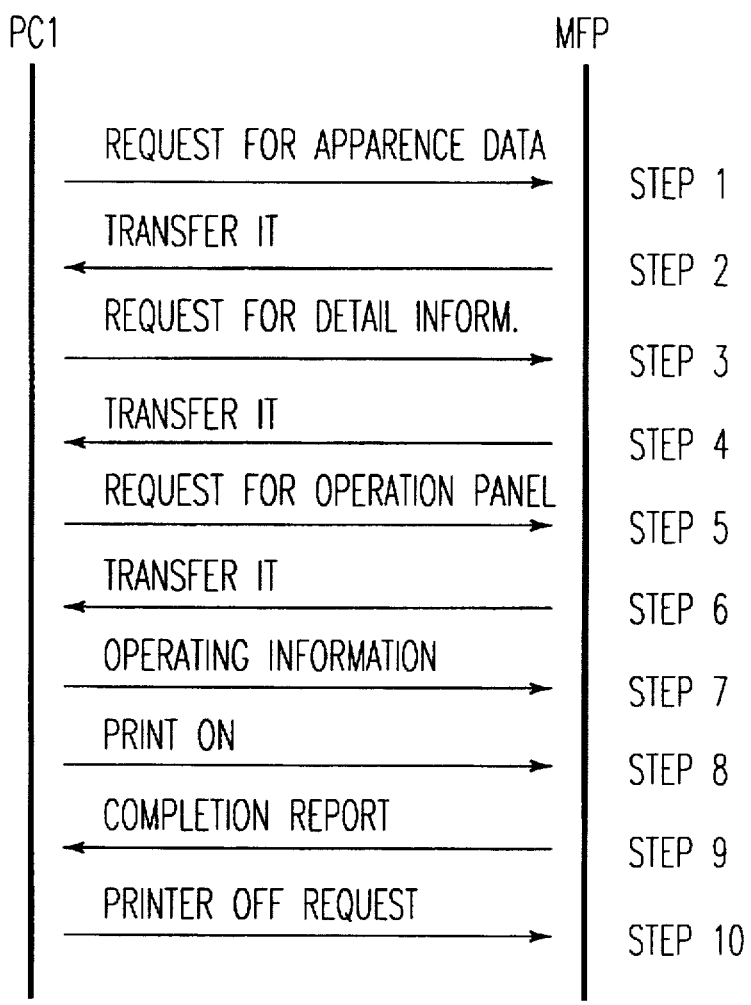
FIG. 6 is a communication sequence or a protocol between a workstation and a copier according to an embodiment of the present invention.

As shown in FIG. 6, an outline of the printing implementation will be explained hereinafter step by step. The client, in this example a personal computer PC1, requests the server MFP to transmit appearance information data (step 1), which is a physical appearance of the server MFP. The server MFP transfers the data to the client (step 2). A displayed picture of the appearance data is displayed at the display device 23 of the client. The user can recognize a structure of the server or copier to see the displayed picture, for example, the user can recognize that there are three paper trays in the picture. When the user wants to know the detailed information of each device of the copier, the user points out the device in the picture and requests detailed information to the server MFP (step 3). In this embodiment, the user requests detailed information about the paper tray. After the server MFP receives the request, the server MFP picks up the detailed information and transfers it to the client (step 4). If the user wants information of other devices of the copier, he/she repeats steps 3 and 4.

After the user has obtained the necessary detailed information which he/she wants to know, the user transfers a request for transmitting a picture of an operation panel (step 5). The MFP server transfers the picture to the client (step 6). The picture of the operation panel is displayed in the display of the client. The user then points out desired operations in the picture of the operation panel to operate the server MFP, and the pointed out information is transferred to the server (step 7). The server MFP then recognizes the pointed out information and sets itself according to the pointed out information. For example, the user points to a picture of a "PRINT ON" button in the picture of the operation panel, which is transferred to the server (step 8). After the server MFP receives data to which the user pointed, the server MFP starts to print according to the order from the client. When the server MFP has finished the printing implementation, the server MFP transfers a signal of "print finish" to the client (step 9). The client then transfers an order of "turning off the PRINT ON button" to the server (step 10). Therefore, the user can control the copier at the terminal remote from the copier.

The appearance information of the device has been stored in the service information storing device 54 of every server MFP in advance. When the server MFP is initialized, the appearance information is stored in formats among a raster data format, a graphics command format, and a device information format.

FIG. 7 shows a data structure of the appearance information written in the raster data format. This data includes two appearance information (front view data and rear view data). "VP" means "view point", such as a front view, a rear view, a right side view, a left side view, and so on. "PN" means "parts number" or device number which shows a number of device to be shown in the appearance picture. "ID" means "device ID" or identification number for each device, such as, a printing engine, a front cover, a paper tray, a discharged paper tray, an ADF, and so on. "TYPE" means a type of the device, for example, a paper tray has "500 papers tray", or "250 papers tray", or "paper reversing tray", and so on. "POSITION" means the position of the device, for example, a paper tray has "a first step position tray", "a second step position tray", and so on. "COOR" means "coordinates" of the device which shows two sets of coordinates to indicate an uppermost left position and a lowermost right position, so that an area of the device will be known.

Each device to be shown in the appearance picture has "ID", "TYPE", "POSITION", and "COOR". "X SIZE" means a X-axis length of the display, and also "Y SIZE" means a Y-axis length of the display. "Appearance Data" is data to show the appearance in the display, for example, a front view data.

FIG. 8 shows a data structure of the appearance information written in the graphics command format. "COM" means "commands" to draw a figure of the appearance of the device. "PARA" means a parameter of the command. The explanation of the same data which has already been explained is omitted.

FIG. 9 shows a data structure of the appearance information written in the logical device information format. Each "TYPE" has it's appearance picture data stored in another part of the memory.

Figure 10:
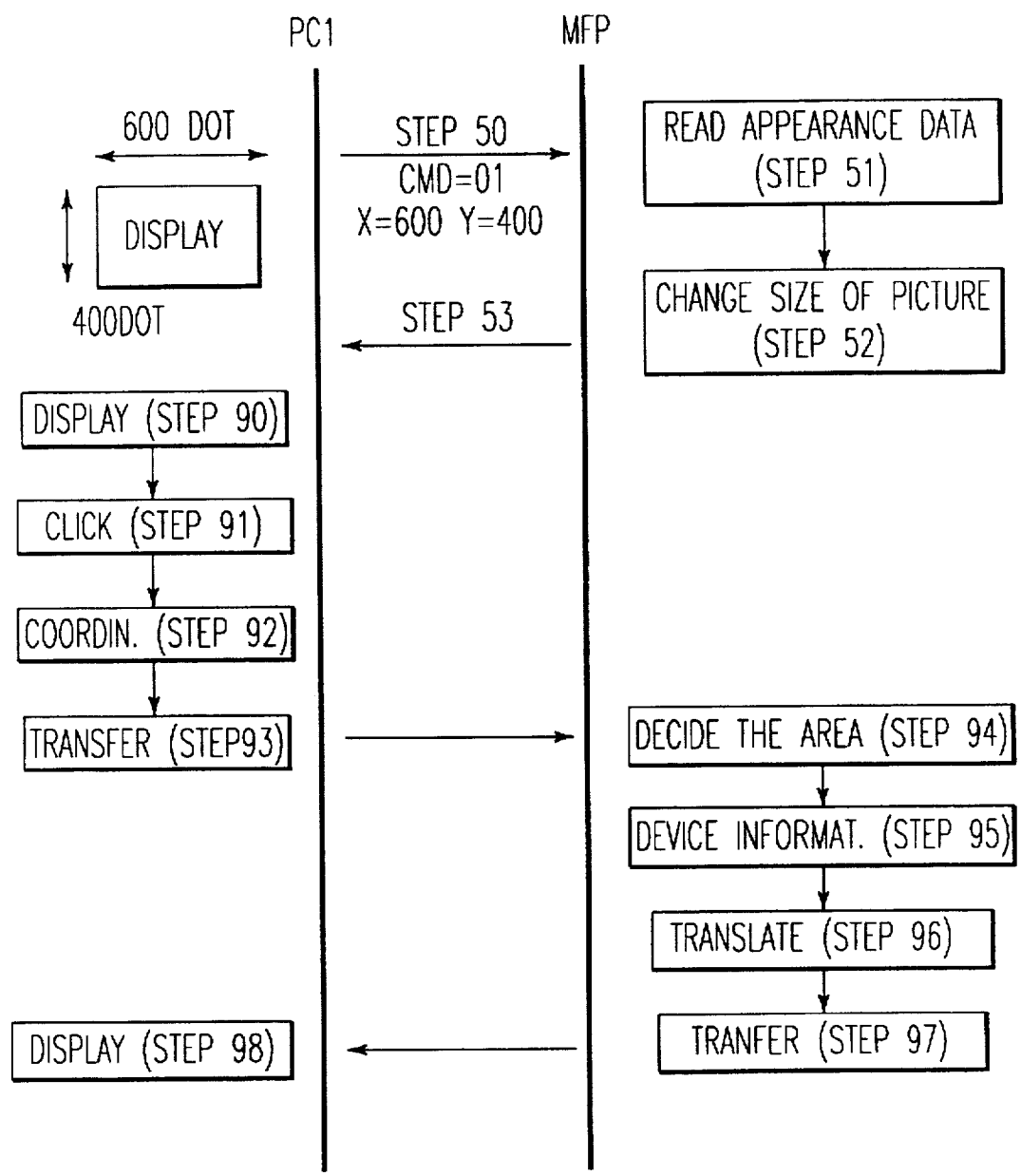
FIG. 10 shows a communication sequence or a protocol in detail between a workstation and a copier as to steps 1 to 4 in FIG. 6, in which a raster data format is used.

FIG. 10 shows a communication sequence in detail between a client, e.g. PC1, and server MFP as to steps 1 to 4 in FIG. 6, in which raster data is used.

The client requests the picture of the appearance information to the server MFP with a command code for data style and a client's display size, for example, CMD=01, X=400 dot & Y=600 dot (step 50). "CMD=01" means that the client requests the picture data in the data style of the raster data. The operation controller 52 of the server reads the appearance information data from service information storing device 54 (step 51), and the size (X size & Y size) of the picture of the appearance information is changed according to the client's display size (step 52). And the information is transferred to the client via the communication controller 55 (step 53). The information is stored in the memory 22 via display controller 25 to display it at the display device 23 (step 90). The user can recognize a structure of the server or copier to see the displayed picture of the appearance information.

Figure 13A:
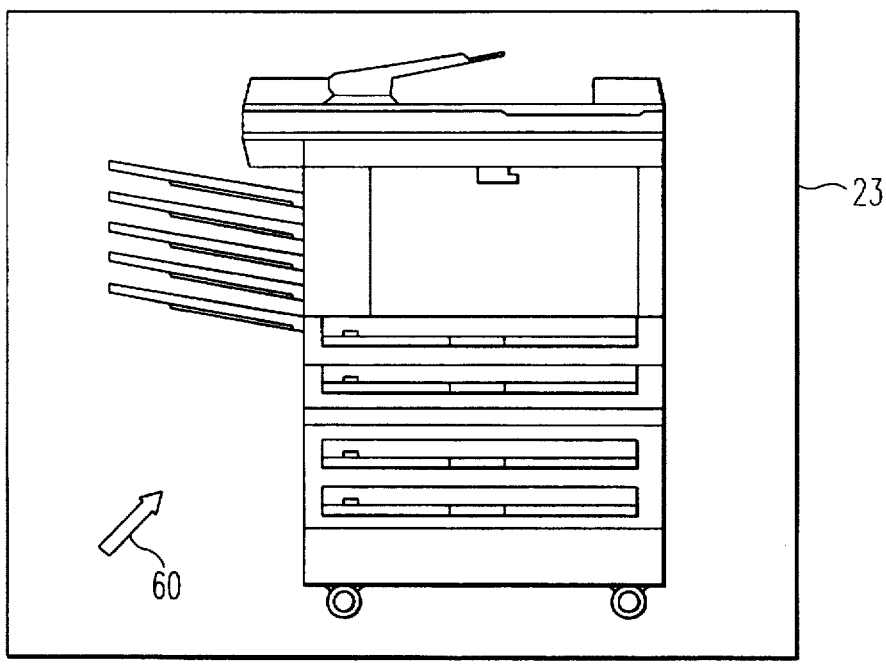
FIG. 13a and 13b show screen images, all of which are displays provided by a workstation.

FIG. 13a shows a screen image on display device 23, all of which is a display provided by the terminals. The screen image includes the appearance information and illustrative pointer 60, which move in response to mouse movements by the user. The user can move the pointer 60 to any position within the screen image including the appearance information.

Figure 13B:
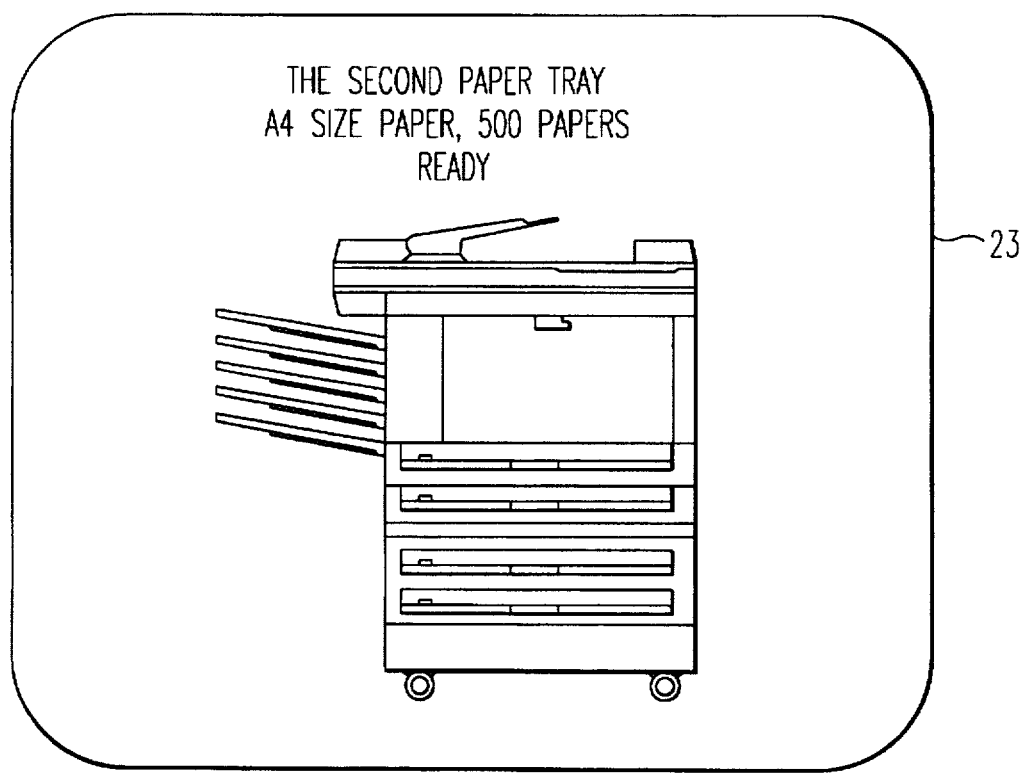

When the user wants to know the detailed information of any device of the copier, the user moves the pointer 60 to the device of which he/she wants information and clicks the mouse at the point of the picture (step 91). Then the client gets a coordinate (x, y) of the point which the pointer 60 pointed out (step 92). The coordinate (x, y) is transferred from the client to the server MFP via the communication device 26 (step 93). After the server MFP receives the coordinate, the operation controller 52 of the server MFP picks up data such as "ID", "TYPE", "POSITION" in the data structure of FIG. 7 which corresponds to the coordinate (x, y) (step 94), and gets the information of the device (step 95). This data for the information is then translated to some letters to appear in the display, such as "the second paper tray, A4 size paper, 500 papers, READY" (step 96). The server MFP then transfers the letters to the client via the communication controller 55 (step 97). After the client receives the information, it is displayed in the display device (step 98). FIG. 13b shows a screen image, all of which is a display provided by the terminals. The screen image includes the letters of the example noted above. The user can then recognize the specifications of the device of which he/she wanted the information on the display.

Figure 11:
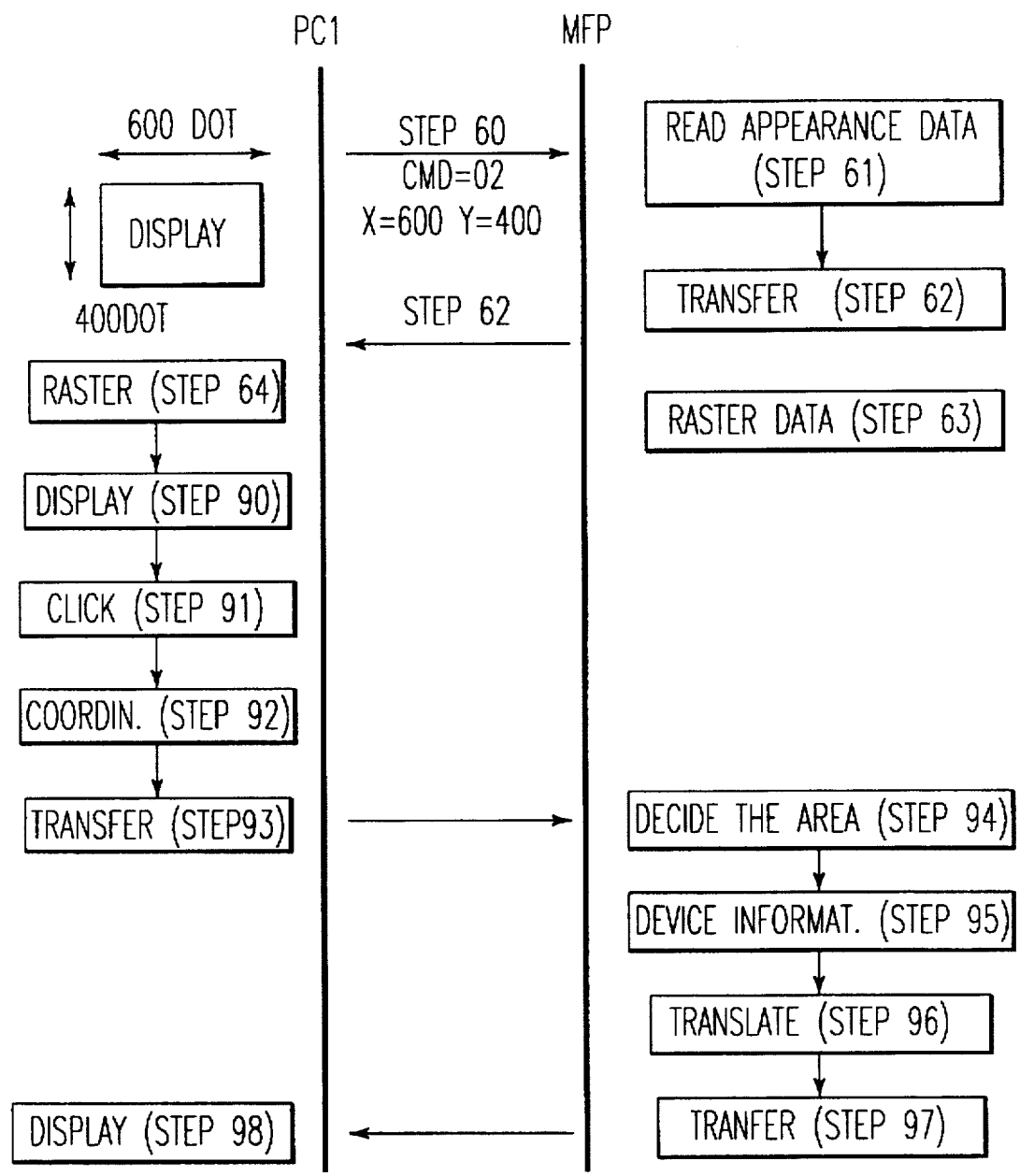
FIG. 11 shows a communication sequence of a protocol in detail between a workstation and a copier as to steps 1 to 4 in FIG. 6, in which a graphic command format is used.

FIG. 11 shows the communication sequence in detail between the client and the server as to steps 1 to 4 in FIG. 6, in which the graphic command format is used. In FIG. 11, steps that serve basically the same procedure as the steps shown in FIG. 10 are given the same reference numerals, and descriptions thereof are omitted.

The client requests the picture of the appearance information to the server with a command code for data style and a client's display size, for example, CMD=02, X=400 dot & Y=600 dot (step 60). "CMD=02" means that the client request the picture data in a data style of graphic command. The operation controller 52 of the server MFP reads the appearance information data from service information storing device 54 (step 61), and the size (X size & Y size) of the picture of the appearance information is changed according to the client's display size. Then the information is transferred to the client via the communication controller 55 (step 62). In both of the server and the client, the graphic commands are translated to raster data (steps 63 & 64). Steps from the step 90 through step 98 are given the same reference numerals of FIG. 10 and an explanation thereto is omitted, because the steps serve the same procedures.

Figure 12:
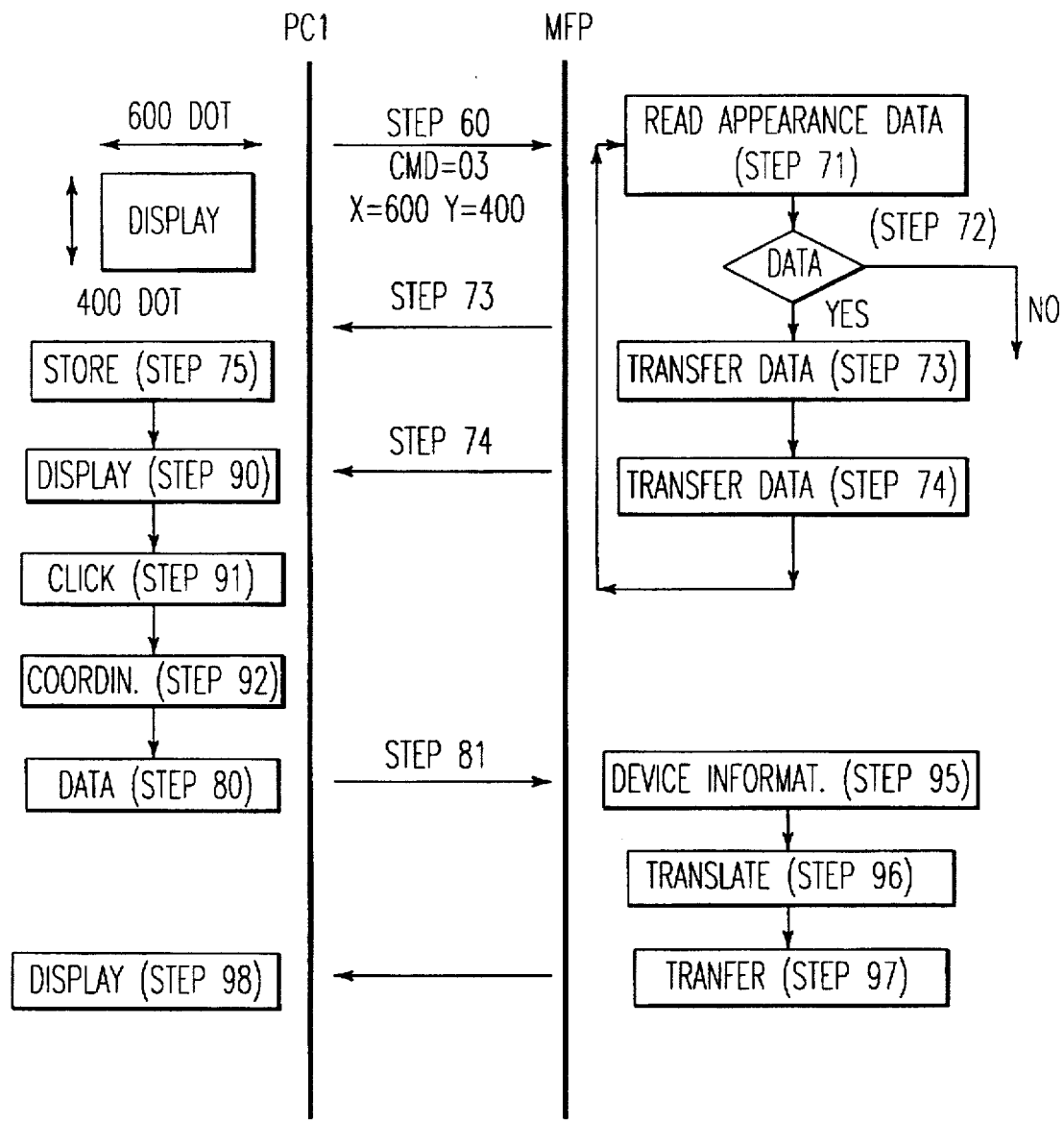
FIG. 12 shows a communication sequence of a protocol in detail between a workstation and a copier as to the steps 1 to 4 in FIG. 6, in which a device information command format is used.

FIG. 12 shows a communication sequence in detail between the client and the server as to steps 1 to 4 in FIG. 6, in which a device information command is used. In FIG. 12, steps that serve basically the same procedure as the steps shown in FIG. 10 are given the same reference numerals, and descriptions thereof are omitted.

The client requests the picture of the appearance information to the server with a command code for data style and a client's display size, for example, CMD=03, X=400 dot & Y=600 dot (step 70). "CMD=03" means that the client requests the picture data in a data style of the device information command. The operation controller 52 of the server MFP reads the appearance information from service information storing device 54 (step 71). If there is data, then it proceeds (step 72). Each set of the information, such as, "ID", "TYPE", and "POSITION" is transferred to the client via the communication controller 55 (step 73). The server MFP picks up displayed picture's data according to the device information command (step 74), and transfers it to the client (step 74). The client stores some sets of the information (step 75). Steps from step 90 through step 98 are given the same reference numerals of FIG. 10 and an explanation thereto is omitted, because the steps serve the same procedures.

Figure 14:
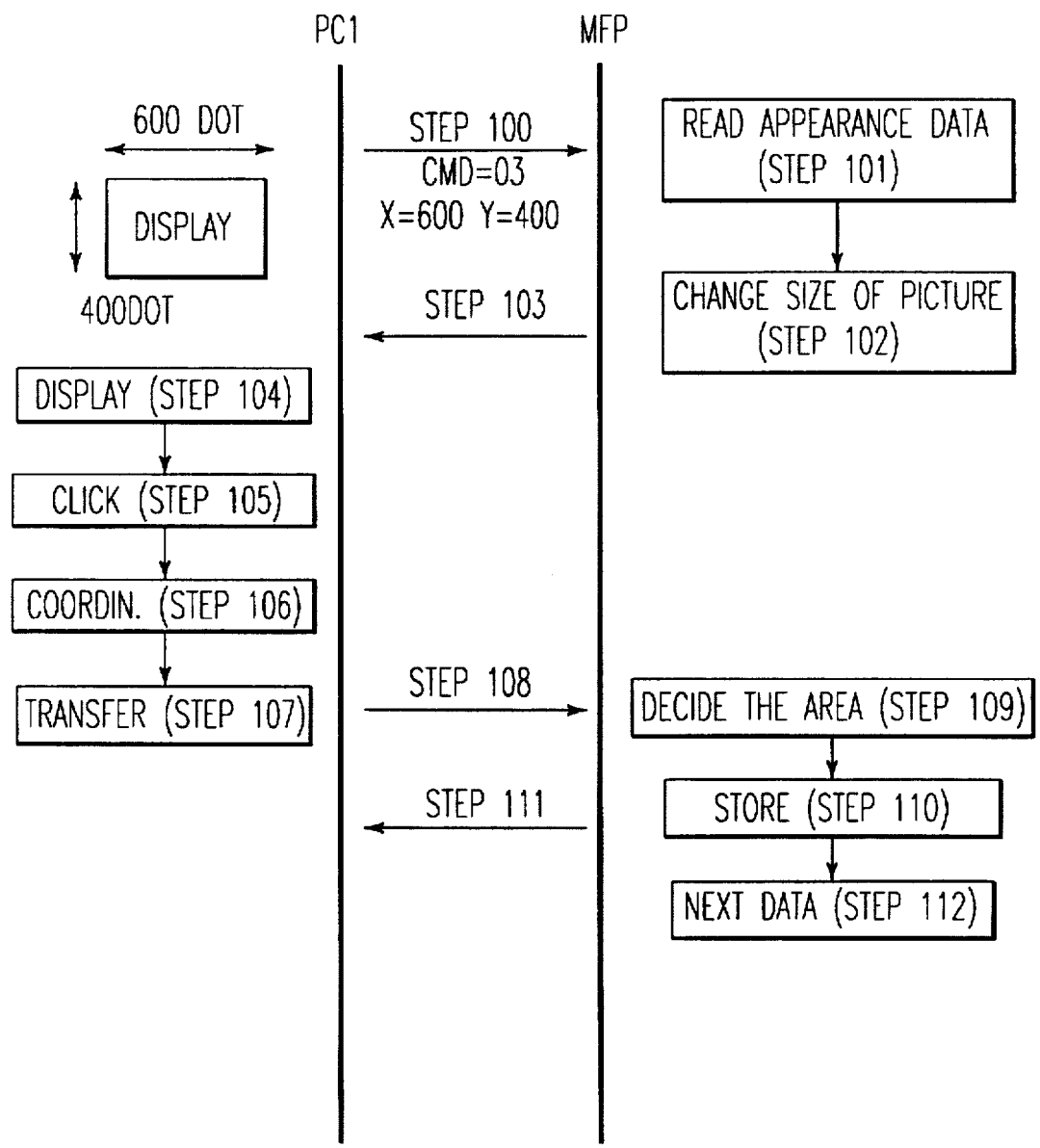
FIG. 14 shows a communication sequence or a protocol in detail between a workstation and a copier as to steps 5 to 7 in FIG. 6, in which both of a raster data format and a graphic commands format are used.

FIG. 14 shows a communication sequence in detail between the client, e.g. PC1, and the server MFP as to steps 5 to 7 in FIG. 6, in which both of raster data and graphic commands are used.

The client requests the operation panel information to the server MFP with a command code and a client's display size, for example, CMD=03, X=400 dot & Y=600 dot (step 100). The operation controller 52 of the server MFP reads panel information from service information storing device 54 (step 101), and the size (X size & Y size) of the picture of the operating panel information is changed according to the client's display size (step 102). And the information is then transferred to the client via the communication controller 55 (step 103). The information is stored in the memory 22 via display controller 25 to display it at the display device 23 (step 104). The user can then recognize how to operate the server or copier to see the displayed picture of the operation panel.

Figure 15:
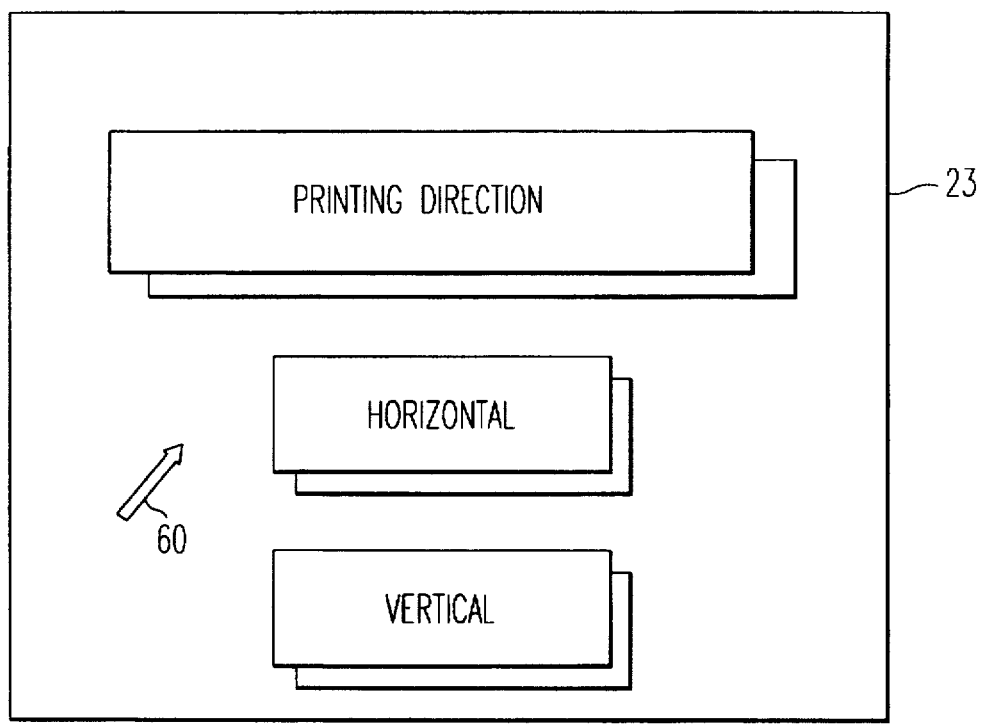
FIG. 15 shows one example of a screen image, all of which is a display provided by a workstation.

FIG. 15 shows one example of the screen image, all of which is a display provided by the terminals. The screen image includes one of the panel information for setting-up the server, for example, "printing direction", "horizontal" direction of a paper or "vertical" direction of a paper, and illustrative pointer 60, in response to mouse movements by the user. The user can move the pointer 60 to any position within the screen image including the appearance information, and click the mouse at the point the user wants to select, for example, "horizontal" (step 105). Then the client gets a coordinate (x, y) of the point which the pointer 60 pointed out (step 106). The coordinate (x, y) is transferred from the client to the server MFP via the communication device 26 (step 108). After the server MFP receives the coordinate, the operation controller 52 of the server determines a position which the coordinate shows (step 109) and stores it (step 110). In this example, the controller 52 stores the "horizontal". The server transfers "OK" signal to a client (step 111). The above steps are repeated until all of the desired panel information are transferred to the client.

Figure 16:
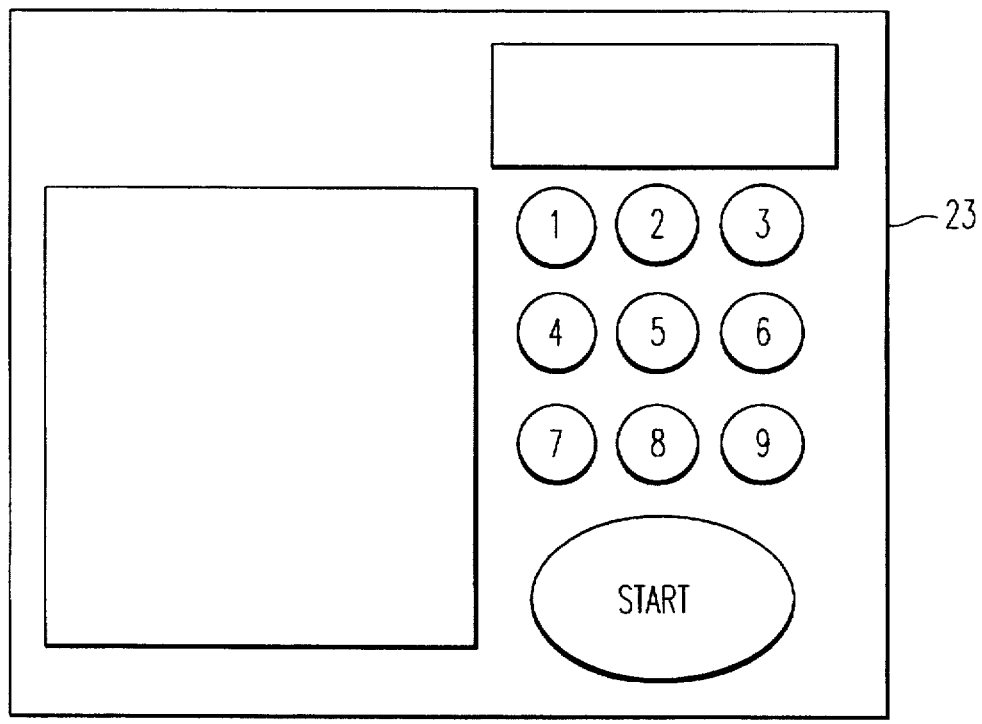
FIG. 16 shows another example of a screen image, all of which is a display provided by a workstation.
Figure 17:
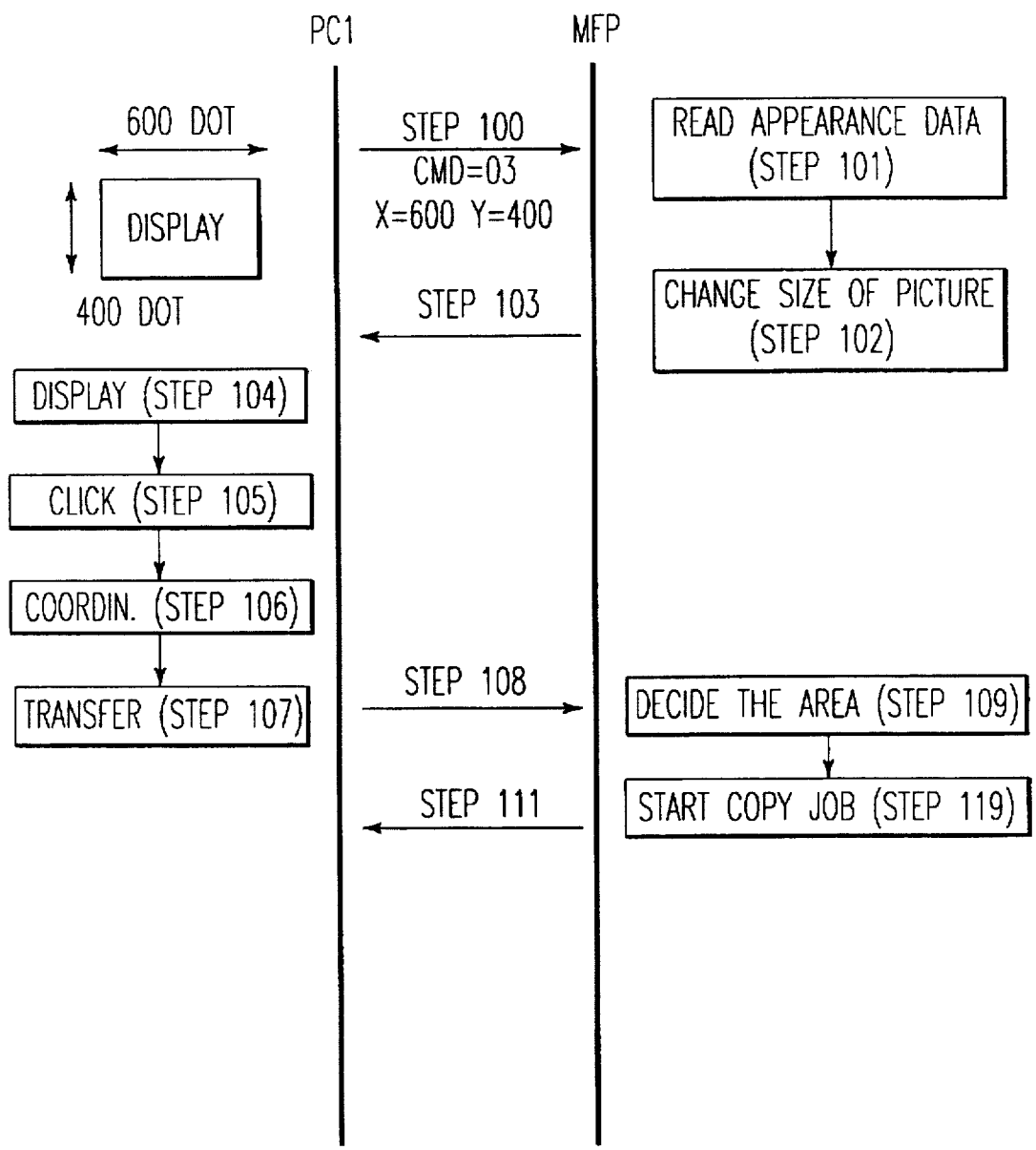
FIG. 17 shows a communication sequence or a protocol in detail between a workstation and a copier as to steps 8 to 9 in FIG. 6.

FIG. 17 shows the communication sequence in detail between the client, e.g. PC1, and the server MFP as to steps 8 to 9 in the FIG. 6. After every panel information which the user wants to determine is rendered, a last panel information including a "START" button shown in FIG. 16 is transferred from the server MFP to the client. In FIG. 17, steps that serve basically the same procedures as the steps shown in FIG. 14 are given the same reference numerals, and descriptions thereof are omitted. When the server MFP receives the coordinate which corresponds to the "START" button, the server MFP starts to implement a copying job (step 119).

Figure 18:
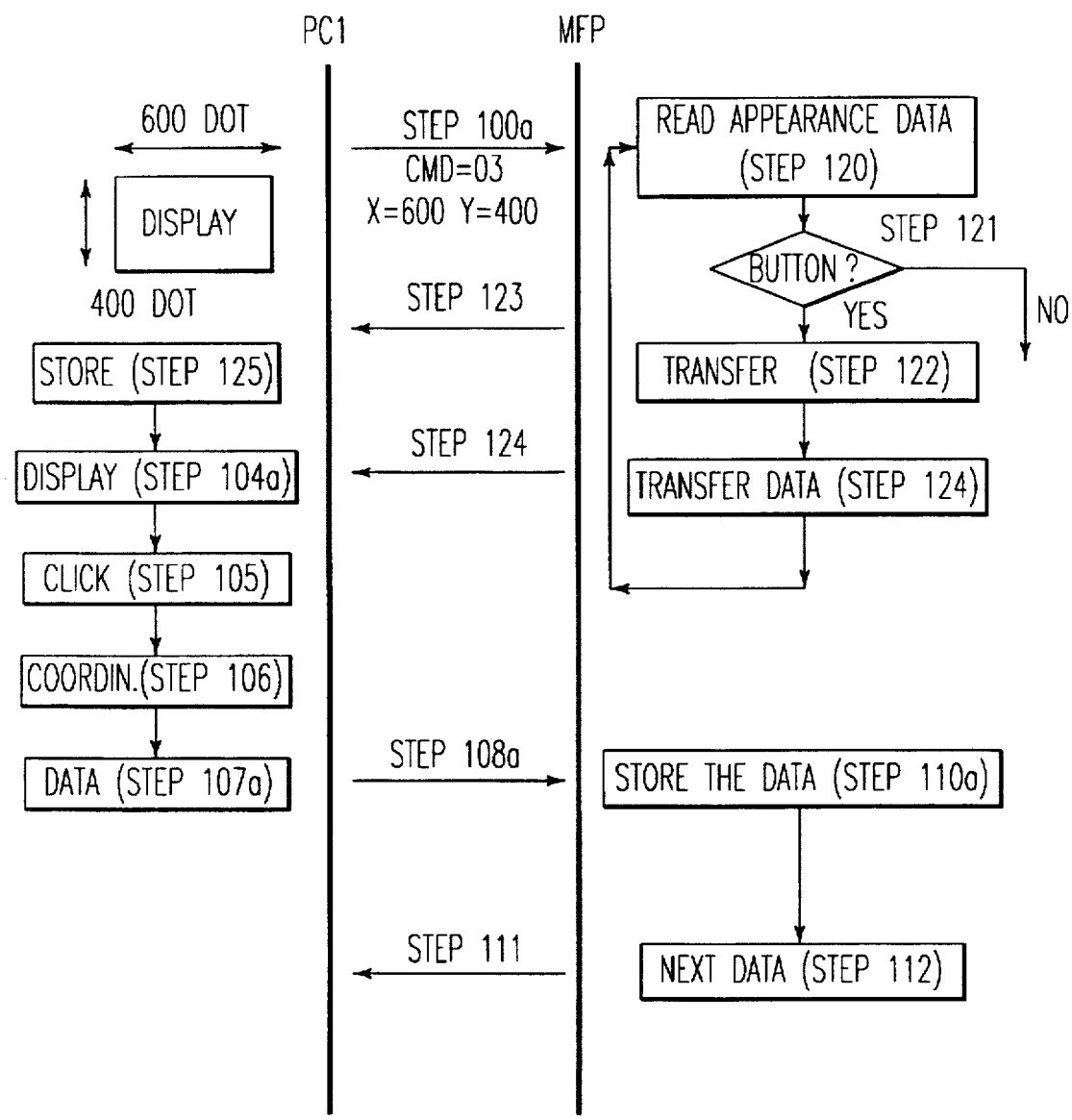
FIG. 18 shows a communication sequence or a protocol in detail between a workstation and a copier as to steps 5 to 7 in FIG. 6, in which a device information format is used.
Figure 19:
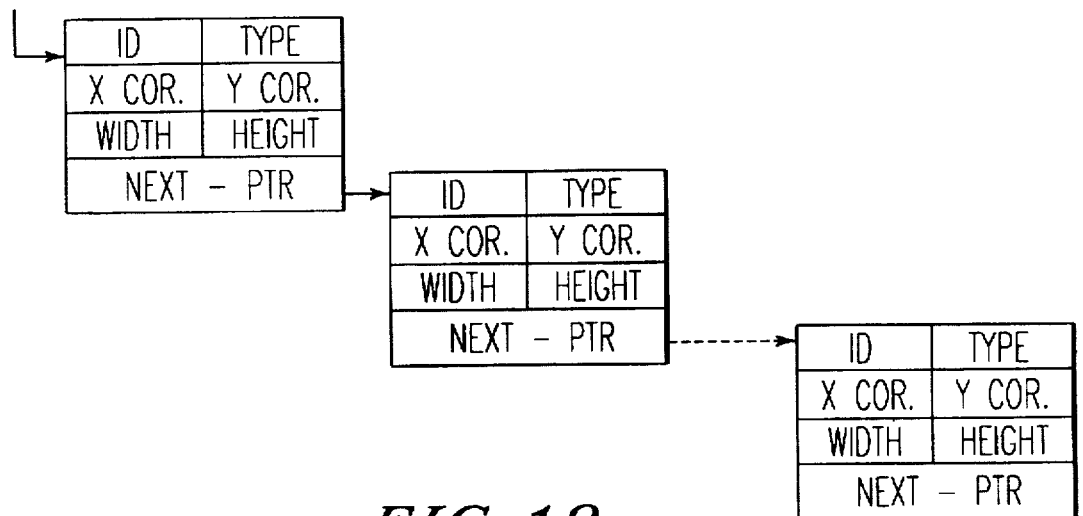
FIG. 19 shows a data structure of a button appearance information written in a device information format.
Figure 20:
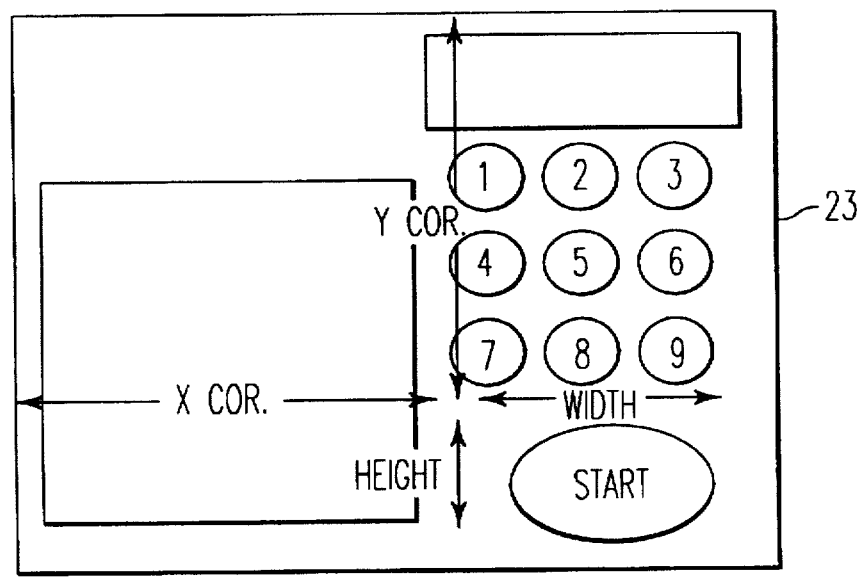
FIG. 20 shows a screen image, for a button appearance, all of which is a display provided by a workstation.

FIG. 18 shows the communication sequence or a protocol in detail between the client, e.g. PC1, and the server MFP as to steps 5 to 7 in the FIG. 6, in which the device information command is used. In FIG. 18, steps that serve basically the same procedures as the steps shown in FIG. 14 are given the same reference numerals, and descriptions thereof are be omitted. In this example, each information for buttons of the operation panel is transferred from the server MFP to the client one by one. FIG. 19 shows data structures of the button information. This data includes "ID", "TYPE", "XCor", "YCor", "WIDTH" and "HEIGHT". "ID" means an identification of each data. "TYPE" means a type of figures of the button, such as a circle or square. "X Cor" means a start's point coordination of a X axis of the button. "Y Cor" means a start's point coordination of a Y axis of the button. "WIDTH" means a width of the button, and "HEIGHT" means a height of the button. "NEXT-prt" means that a next button will be continued, and "0" means that the button is the last one so that it is not necessary to continue. FIG. 20 shows one example of the buttons.

The client requests the operation panel information to the server MFP with a command code and a client's display size, for example, CMD=03, X=600 dot & Y=400 dot (step 100a). The operation controller 52 of the server MFP reads the information from service information storing device 54 (step 120). If there is information of the button, then the operation continues (step 121). The information is transferred to the client via the communication controller 55 (step 122). Then a raster data corresponding to the "TYPE" data is transferred from the server MFP to the client (step 124), if the client has not had the raster data in advance. If the client has already had the raster data at first or stored the last one, it is not necessary to transfer the raster data.

The information is then stored in the memory 22 (step 125) via display controller 25 to display it at the display device 23 (step 104a). The user can recognize a structure of the server or copier to see the displayed picture of the appearance information. The user can then move the pointer 60 to any position within the screen image including the appearance information, and click the mouse at the point the user wants to select, for example "horizontal" (step 105). Then the client gets a coordinate (x, y) of the point which the pointer 60 pointed out (step 106). The "ID" data corresponding to the coordinate is picked up (step 107a) and is transferred from the client to the server MFP via the communication device 26 (step 108a). After the server MFP receives the coordinate, the operation controller 52 of the server stores it (step 110a). The server transfers "OK" signal to a client (step 111) and starts to obtain the next button's data. The above steps are repeated until all of the button of the panel information are transferred to the client.

Figures 21, 22:
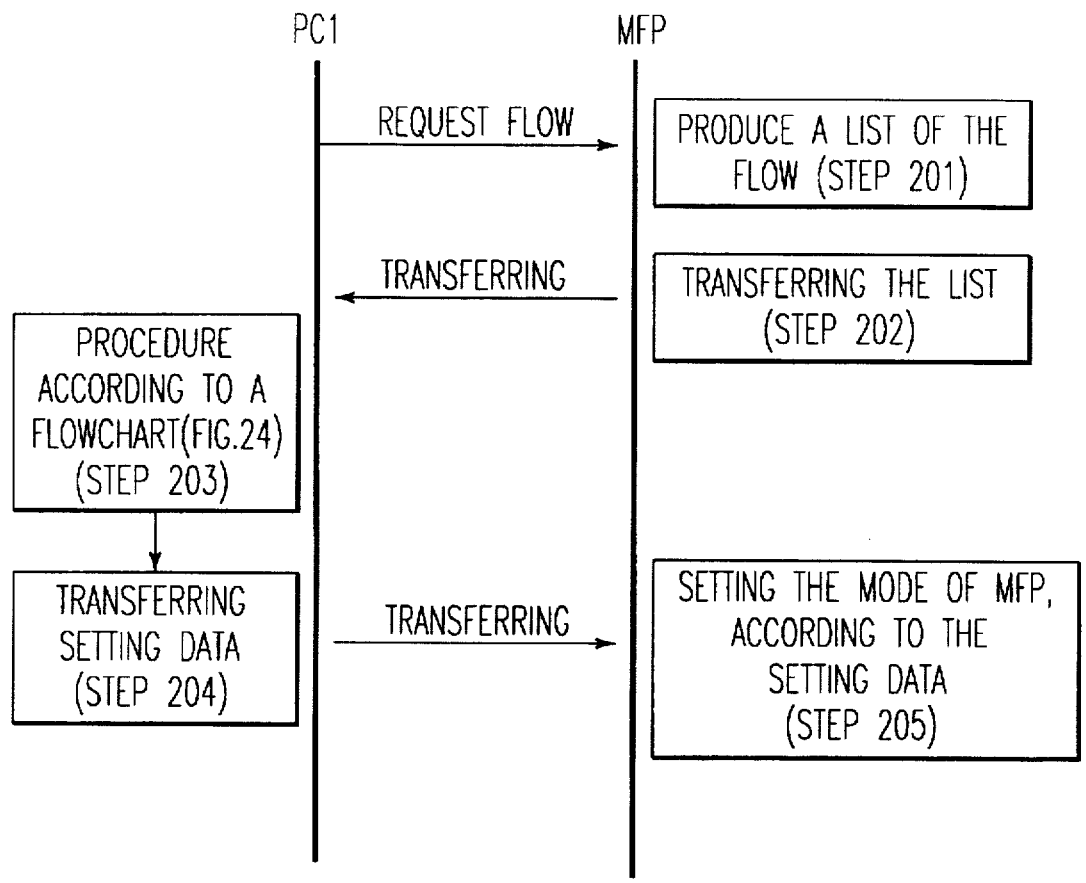
FIG. 21 shows another communication sequence or protocol in detail between a client and a server as to steps 5 to 7 in FIG. 6.
FIG. 22 shows a data construction for buttons which appear in a display of a client's computer for using the above mentioned procedure of FIG. 21.

FIG. 21 shows another communication sequence or protocol in detail between the client, e.g. PC1, and the server MFP as to steps 5 to 7 in FIG. 6. In FIG. 21, the client requests a list of an operation managing flow which will be explained later. The server MFP produces the list (step 201) and transfers the list to the client (PC1) (step 202). The list appears in the display device of the client's computer (PC1). The client conducts procedures according to the list, which is explained later by using a flowchart of FIG. 24 (step 203). Then the client transfers the setting data to the server MFP (step 204). The server MFP sets a mode of the copier according to the setting data (step 205).

FIG. 22 shows a data construction for buttons which appear in the display of the client's computers for using the above mentioned procedure of FIG. 21. This data includes "ID", "TYPE", "X Cor", "Y Cor", "WIDTH", "HEIGHT", "next button prt", "next window ptr", and "ESC SEQUENCE". "ID" means an identification of each data. "TYPE" means a type of figures of the button, such as a circle or square. "X Cor" means a start's point coordination of a X-axis of the button. "Y Cor" means a start's point coordination of a Y-axis of the button. "WIDTH" means a width of the button, and "HEIGHT" means a height of the button. (See also FIG. 20). "Next button prt" points to a next button which appears in the same display screen. "Next window ptr" points to a next display screen which should appear after the present screen. "ESC SEQUENCE" shows data which should be input by being pointed on the button.

Figure 23:
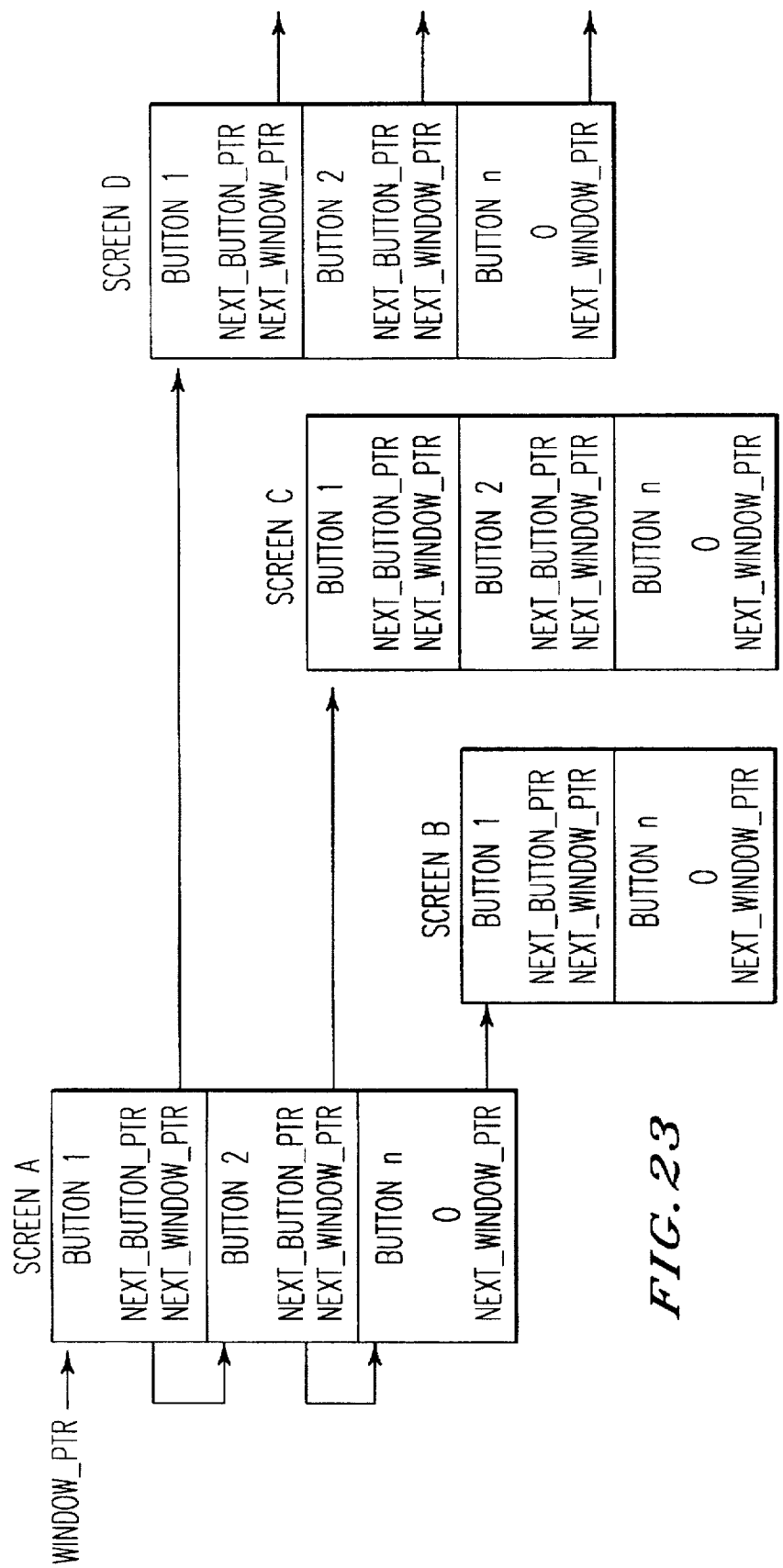
FIG. 23 shows a structure of a list of an operation managing flow.

FIG. 23 shows a structure of the list of the operation managing flow. FIG. 23 shows a list of constructions of four display screens, such as screen A, B, C and D. In each screen, there are some data constructions for the buttons. At first, a first operation panel which has a screen A appears in the display screen. In detail, Button 1 appears in the display and the "next button prt" of the first Button 1 indicates the next Button 2. Therefore, the second Button 2 appears in the same display screen of the first Button 1. Repeatedly, some buttons appear in the same display screen. In the first Screen A, when the first Button 1 is pointed out by the pointer which has already been explained, the display screen is changed to a next Screen D, because the "next window ptr" of the Button 1 tells the Screen D. According to this procedure, the screen of the display is changed, and the selected data by the pointing device is stored in the "ESC SEQUENCE" to implement the server (MFP).

Figure 24:
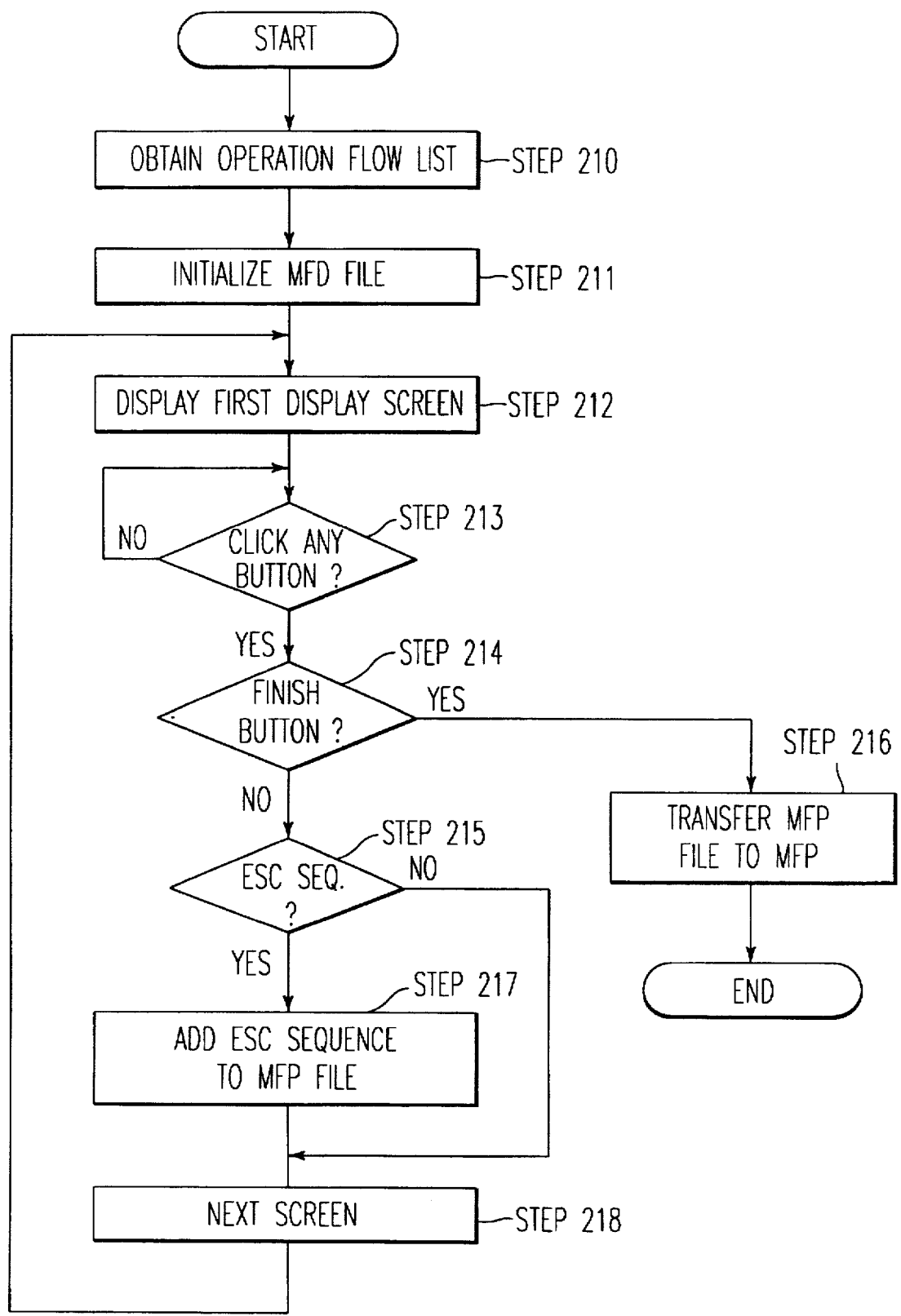
FIG. 24 shows a flowchart of a control in the present invention.

FIG. 24 shows a flowchart for procedures of the client (PC1) of step 203 of FIG. 21. After obtaining the transferred list from the server MFP (step 210), a MFP file of the client is initialized (step 211) and the first screen for the display is displayed in the display of the client (step 212). If one of the buttons of the screen is clicked on by pointer 60, then it goes to "YES" and to step 214. If not, then it goes to "NO" and returns to step 213. In step 214, if the finish button is clicked on, then it goes to "YES" and the MFP file is transferred to the server (MFP) (step 216). If "NO" in step 214, the system proceeds to step 215. If there is a "ESC SEQUENCE" to be stored, i.e., "YES" in step 215, the "ESC SEQUENCE" is stored or added in the MFP file (step 217). If not, then it goes to "NO" and proceeds to step 218. Then in step 218 the next screen is appeared according to the information of the "next window ptr", then the system proceeds back to step 212.

According to the above embodiment explained by using FIGS. 21 to 24, the buttons or the other displayed images which appear in the display screen of the client or the personal computer are exactly the same as that which appear in the display of the operation panel of the server or the copier. Therefore, it is very easy for the users to operate the copier from his/her personal computer remotely, because he/she has to know just only one procedure to operate the copier.

While the invention has been described with reference to the structure disclosed, it is not confined to the details set forth, but is intended to cover such modifications or changes as may come within the scope of the following claims.

What is claimed as new and desired to be secured by Letters Patent of the United States is:

1. A print manager system for a copier in a network, comprising:

at least one copier, including an operation panel for displaying images for operating the at least one copier, means for storing display data for displaying on the operation panel, and means for transferring the display data; and at least one terminal connected to the at least one copier, including means for receiving the display data from the transferring means of the at least one copier, and a display device for displaying same images as displayed on the operation panel of the at least one copier according to the display data transferred from the at least one copier.

2. The system of claim 1, wherein the at least one terminal further comprises a pointing device for pointing to a part of the displayed images of the display device.

3. The system of claim 2, wherein the at least one terminal further comprises a communication device for transferring a coordinate numerical data of the part of the displayed images pointed to by the pointing device to the at least copier.

4. The system of claim 2, wherein the pointing device is a mouse.

5. The system of claim 3, wherein the pointing device is a mouse.

6. The system of claim 1, wherein the display data transferred from the at least one copier to the at least one terminal and displayed on the display device of the at least one terminal comprises next image information which appears in a same display screen, and next screen information which appears after a present screen.

7. The system of claim 1, further comprising:
an object request broker connected to the at least one copier and the at least one terminal, for interfacing between the at least one copier and the at least one terminal for selecting a best available copier of the at least one copier for the at least one terminal.

8. The system of claim 6, wherein the at least one terminal further comprises a pointing device for pointing to a part of the displayed images of the display device.

9. The system of claim 6, wherein the at least one terminal further comprises a communication device for transferring a coordinate numerical data of the part of the displayed images pointed to by the pointing device to the at least one copier.

10. The system of claim 8, wherein the pointing device is a mouse.

11. The system of claim 9, wherein the pointing device is a mouse.

12. A print manager system for a copying machine in a network, comprising:
at least one copier, each respective copier including an operation panel for displaying images for operating the respective copier, a CPU for controlling the respective copier, a memory for storing respective control programs and copier appearance data, and a communication device for transferring the appearance data, the appearance data including a picture of the operation panel of the respective copier;
at least one terminal connected to the at least one copier, including a display device for displaying same images as displayed on the operation panel according to the appearance data transferred from the at least one copier, a pointing device for pointing to a part of the displayed images of the display device, and a communication device for transferring a coordinate numerical data of the part of the displayed images pointed to by the pointing device to the copier machine; and
an object request broker connected to the at least one copier and the at least one terminal, including a CPU controlling the object request broker, a memory storing control programs for controlling the object broker, and a service controller for controlling an interface between the at least one copier and the at least one terminal for selecting a best available of the at least one copier for the at least one terminal.

13. A printing managing process for controlling printing of print jobs in a network printing system having at least one copier and at least one terminal, comprising the steps of:
a) at said at least one terminal, requesting the at least one copier to transmit an image of appearance information of the at least one copier;
b) at said at least one copier, transferring all of the image of the appearance information to the at least one terminal;
c) at said at least one terminal, displaying a first screen image from the transferred appearance information at a display device, noting a part of the displayed image pointed to by a pointing device, storing coordinate information of the information pointed to by the pointing device, and transferring the coordinate information to the at least one copier;
d) at said at least one copier, receiving the coordinate information, and controlling the at least one copier according to the received coordinate information.

14. A print managing process for controlling printing of print jobs in a network printing system having at least one copier and at least one terminal, comprising the steps of:
a) at said at least one terminal, requesting the at least one copier to transmit an image of appearance information of the at least one copier;
b) at said at least one copier, transferring the image of the appearance information to the at least one terminal;
c) at said at least one terminal, displaying a first screen image from the transferred appearance information at a display device, noting a part of the displayed image pointed to by a pointing device, storing coordinate information of the information pointed to by the pointing device as coordinate numeral data, and transferring the coordinate numeral data to the at least one copier;
d) at said at least one copier, receiving the coordinate numeral information, and controlling and operating the at least one copier according to the received coordinate numeral information.

15. A print manager system for an imaging device in a network, comprising:
at least one imaging device, including an operation panel for displaying images for operating the at least one imaging device, means for storing display data for displaying on the operation panel, and means for transferring the display data; and
at least one terminal connected to the at least one imaging device, including means for receiving the display data from the transferring means of the at least one imaging device, and a display device for displaying same images as displayed on the operation panel of the at least one imaging device according to the display data transferred from the at least one imaging device.

16. A print manager system for a copying machine in a network, comprising:
at least one copier, each respective copier including an operation panel for displaying images for operating the respective copier, a CPU for controlling the respective copier, a memory for storing respective control programs and copier appearance data, and a communication device for transferring the appearance data, the appearance data including a picture of the operation panel of the respective copier; and
at least one terminal connected to the at least one copier, including a display device for displaying same images as displayed on the operation panel according to the appearance data transferred from the at least one copier, a pointing device for pointing to a part of the displayed images of the display device, and a communication device for transferring a coordinate numerical data of the part of the displayed images pointed to by the pointing device to the copier machine.

* * * * *